United States Patent
Zhao et al.

(10) Patent No.: US 12,253,659 B2
(45) Date of Patent: Mar. 18, 2025

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Qinghua Zhao, Nara (JP); Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 729 days.

(21) Appl. No.: 17/377,776

(22) Filed: Jul. 16, 2021

(65) Prior Publication Data
US 2021/0341715 A1 Nov. 4, 2021

Related U.S. Application Data

(63) Continuation of application No. PCT/JP2019/043711, filed on Nov. 7, 2019.

(30) Foreign Application Priority Data

Jan. 25, 2019 (JP) ................... 2019-011466

(51) Int. Cl.
*G02B 13/16* (2006.01)
*G02B 13/00* (2006.01)
(Continued)

(52) U.S. Cl.
CPC .......... *G02B 13/16* (2013.01); *G02B 13/0045* (2013.01); *G02B 15/145527* (2019.08); *G03B 21/142* (2013.01)

(58) Field of Classification Search
CPC ................ G02B 13/16; G02B 13/0045; G02B 15/145527; G02B 27/0012;
(Continued)

(56) References Cited

U.S. PATENT DOCUMENTS

2014/0355127 A1 12/2014 Nagahara
2015/0077848 A1 3/2015 Ichimura
(Continued)

FOREIGN PATENT DOCUMENTS

EP 1 978 393 10/2008
EP 1978393 A1 * 10/2008 ..... G02B 15/145531
(Continued)

OTHER PUBLICATIONS

International Search Report issued Jan. 28, 2020 in International (PCT) Application No. PCT/JP2019/043711 with English translation.
(Continued)

*Primary Examiner* — Wyatt A Stoffa
*Assistant Examiner* — Ray Alexander Dean
(74) *Attorney, Agent, or Firm* — Wenderoth, Lind & Ponack, L.L.P.

(57) ABSTRACT

The present disclosure is directed to an optical system internally having an intermediate imaging position that is conjugated to a magnification conjugate point on a magnification side and a reduction conjugate point on a reduction side, respectively, the optical system including: a magnification optical system having A (A is an integer of three or more) pieces of lens elements, positioned on the magnification side with respect to the intermediate imaging position; and a relay optical system having B (B is an integer of two or more) pieces of lens elements, positioned on the reduction side with respect to the intermediate imaging position. A first lens group composed of $\beta$ pieces ($\beta$ is one or more and less than B) of lens elements positioned first from the magnification side in the relay optical system has a negative power.

13 Claims, 16 Drawing Sheets

(51) Int. Cl.
*G02B 15/14* (2006.01)
*G03B 21/14* (2006.01)

(58) Field of Classification Search
CPC .... G02B 15/144511; G02B 15/144515; G03B 21/142
See application file for complete search history.

(56) References Cited

U.S. PATENT DOCUMENTS

| | | |
|---|---|---|
| 2015/0103403 A1 | 4/2015 | Oe et al. |
| 2015/0234167 A1* | 8/2015 | Ode .................... G02B 15/142 359/432 |
| 2015/0268453 A1 | 9/2015 | Oe et al. |
| 2016/0291300 A1 | 1/2016 | Nagatoshi |
| 2018/0059391 A1* | 3/2018 | Inoue ............. G02B 15/145531 |
| 2018/0059519 A1 | 3/2018 | Nagatoshi et al. |
| 2018/0307041 A1 | 10/2018 | Masui et al. |
| 2019/0025561 A1 | 1/2019 | Imaoka |

FOREIGN PATENT DOCUMENTS

| | | | |
|---|---|---|---|
| EP | 2 899 581 | 7/2015 | |
| JP | 2009-020189 | 1/2009 | |
| JP | 2015-60062 | 3/2015 | |
| JP | 2015-179270 | 10/2015 | |
| JP | 2016-161879 | 9/2016 | |
| JP | 2016-194638 | 11/2016 | |
| JP | 2017-126036 | 7/2017 | |
| JP | 2018-36388 | 3/2018 | |
| JP | 2018-180447 | 11/2018 | |
| WO | 2014/045596 | 3/2014 | |
| WO | WO-2014045596 A1 * | 3/2014 | ..... G02B 15/145527 |
| WO | 2017/195857 | 11/2017 | |

OTHER PUBLICATIONS

English translation of International Preliminary Report on Patentability and Written Opinion of the International Searching Authority issued Jul. 27, 2021 in International (PCT) Application No. PCT/JP2019/043711.

Extended European Search Report issued on Feb. 7, 2022, in European Patent Application No. 19912101.3.

Office Action issued Dec. 13, 2022 in corresponding Chinese Patent Application No. 201980090222.8, with partial English language translation.

Japanese Office Action issued May 9, 2023 in corresponding Japanese Patent Application No. 2020-567375, with English machine translation.

Office Action issued Apr. 15, 2022 in Chinese Patent Application No. 201980090222.8, with search report and English-language translation.

Japanese Office Action issued Aug. 22, 2023 in corresponding Japanese Patent Application No. 2020-567375, with English machine translation.

* cited by examiner

OPTICAL SYSTEM, IMAGE PROJECTION APPARATUS, AND IMAGING APPARATUS

CROSS-REFERENCE OF RELATED APPLICATIONS

This application is a continuation of International Patent Application No. PCT/JP2019/043711, filed on Nov. 7, 2019, which claims the benefit of Japanese Patent Application No. 2019-011466, filed on Jan. 25, 2019, the contents all of which are incorporated herein by reference.

TECHNICAL FIELD

The present disclosure relates to an optical system that forms an intermediate image. The present disclosure also relates to an image projection apparatus and an imaging apparatus using such an optical system.

BACKGROUND

Patent Document 1 discloses a zoom optical system that utilizes a re-imaging method, with a wide angle of view, high optical performance over the entire zoom range, and easy miniaturization. The zoom optical system is constituted of a first optical system and a second optical system having a zooming function in this order from the magnification conjugate side to the reduction conjugate side. The zoom optical system has an optical function in which a magnification conjugate point on the magnification conjugate side is imaged at an intermediate imaging position between the first optical system and the second optical system, and the image formed at the intermediate imaging position is re-imaged on a reduction conjugate point on the reduction conjugate side.

Patent Document 2 discloses a wide-angle, compact and simple zoom lens. The zoom lens forms an intermediate imaging at a position conjugated to a reduction-side image forming plane and the intermediate imaging is re-imaged on a magnification-side image forming plane, and a first optical system is located on the magnification side with respect to the intermediate imaging position and a second optical system is located on the reduction side thereto. The second optical system includes two moving lens groups that can move while changing the interval in the optical axis direction between the neighboring groups during zooming, and two fixed lens groups fixed to the reduction-side image forming surface during zooming.

Patent Document

[Patent Document 1] JP 2018-036388 A
[Patent Document 2] JP 2018-180447 A

SUMMARY

The present disclosure provides an optical system that can realize a wide-angle and compact zoom lens at low cost. The present disclosure also provides an image projection apparatus and an imaging apparatus using such an optical system.

One aspect of the present disclosure is directed to an optical system internally having an intermediate imaging position MI that is conjugated to a magnification conjugate point on a magnification side and a reduction conjugate point on a reduction side, respectively, the optical system including:

a magnification optical system having A (A is an integer of three or more) pieces of lens elements, positioned on the magnification side with respect to the intermediate imaging position; and a relay optical system having B (B is an integer of two or more) pieces of lens elements, positioned on the reduction side with respect to the intermediate imaging position MI, wherein a first lens group composed of β pieces (β is one or more and less than B) of lens elements positioned first from the magnification side in the relay optical system has a negative power.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

In the optical system according to the present disclosure, the first lens group G1 positioned first from the magnification side with respect to the intermediate imaging position has a negative power, thereby the wide-angle lens is easy to manufacture and the distortion aberration can be easily corrected. Thus, the load of correction by the lens positioned closest to the magnification side can be reduced. Consequently, a wide-angle and compact zoom lens can be realized at low cost.

DESCRIPTION OF EMBODIMENT

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, a first embodiment of the present disclosure is described with reference to FIGS. 1 to 15. Here, a zoom lens system is described as an example of the optical system.

Figure 1:
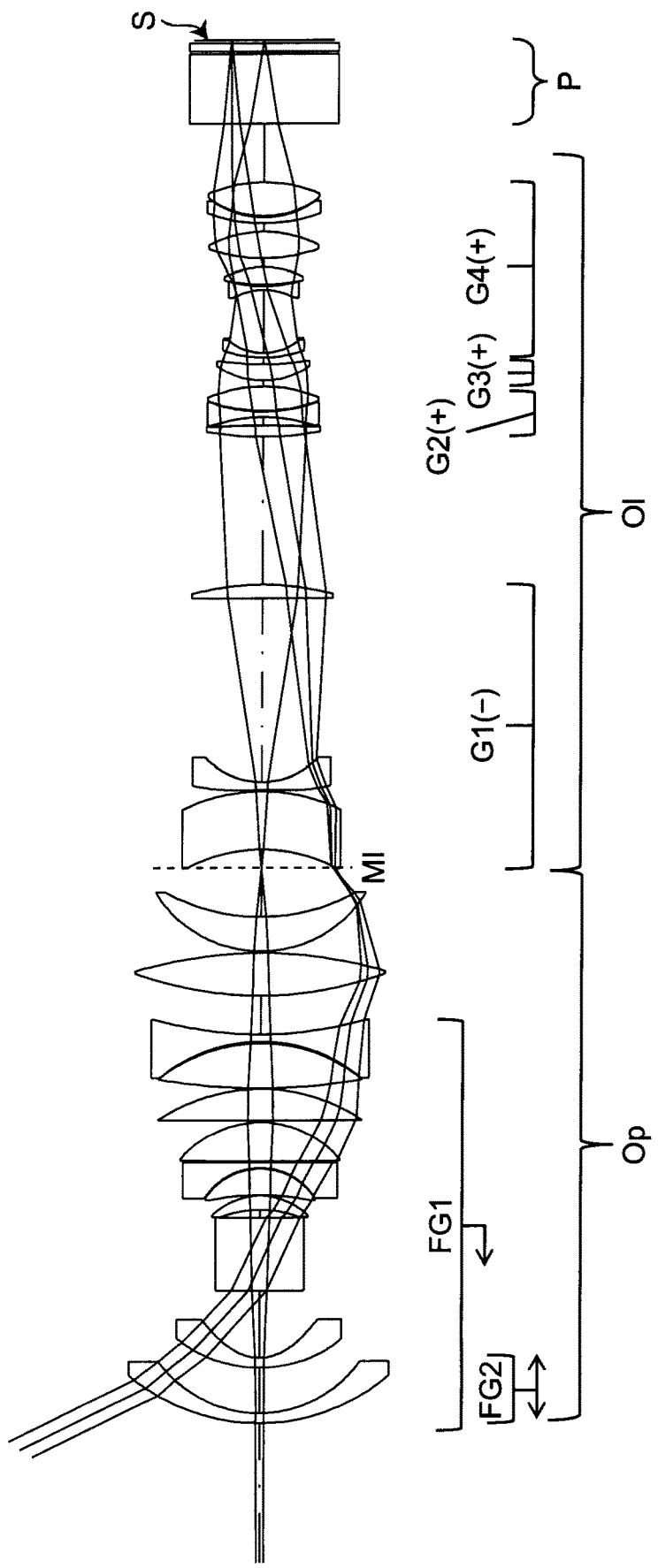
FIG. 1 is a layout diagram showing an optical path at a wide-angle end in a zoom lens system of example 1 for an object distance of 900 mm.
Figure 6:
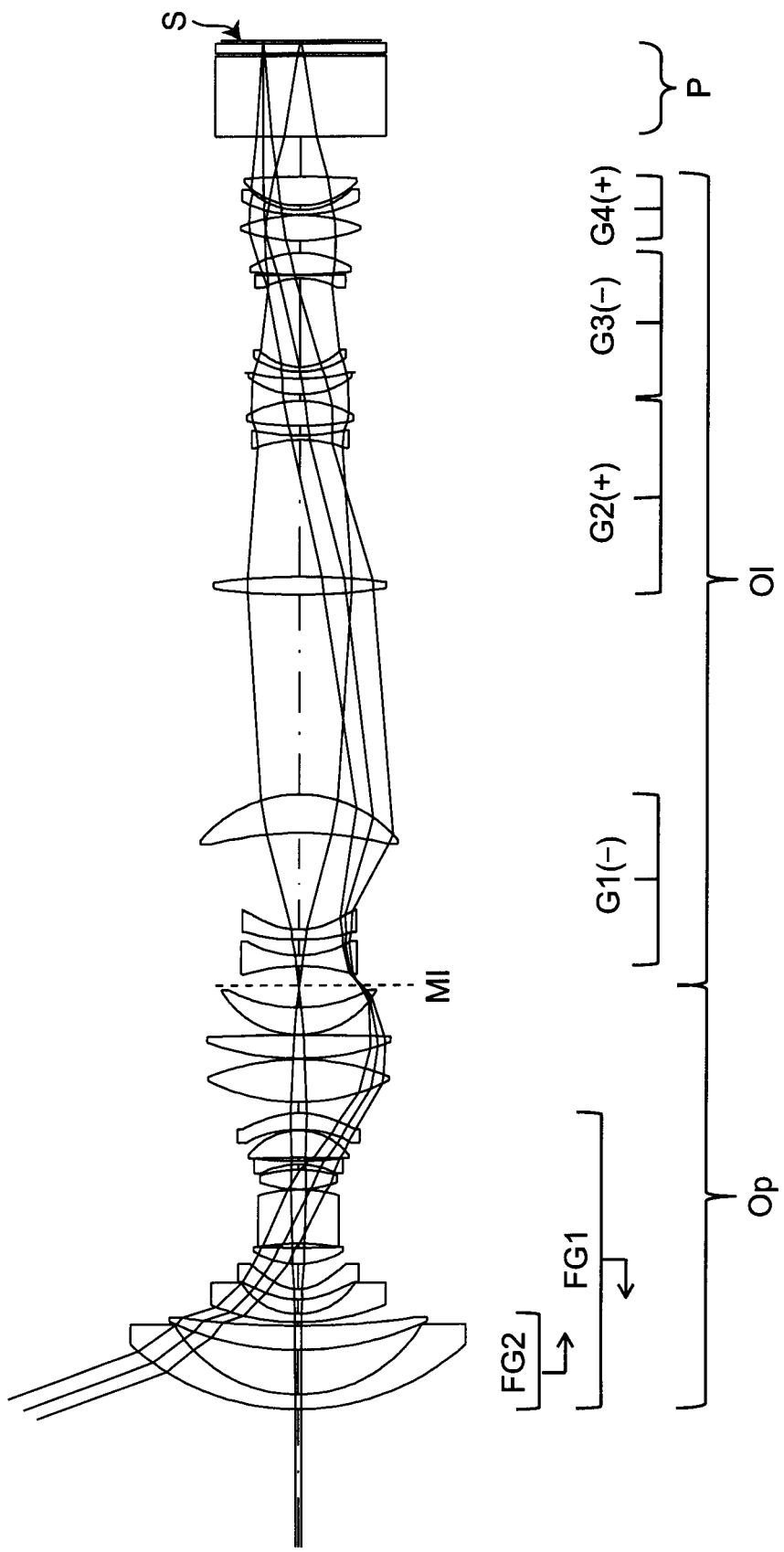
FIG. 6 is a layout diagram showing an optical path at a wide-angle end in a zoom lens system of example 2 for an object distance of 900 mm.
Figure 11:
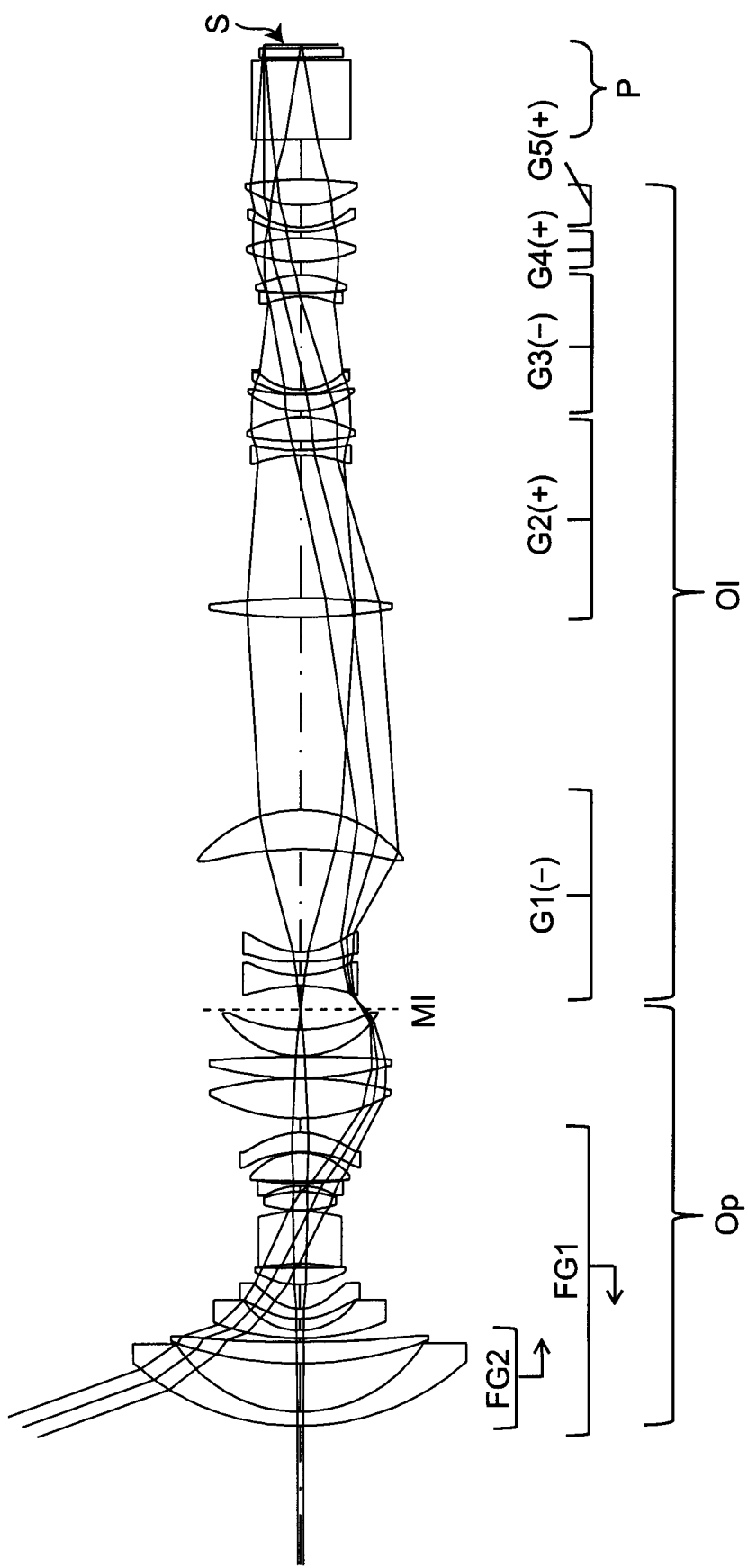
FIG. 11 is a layout diagram showing an optical path at a wide-angle end in a zoom lens system of example 3 for an object distance of 900 mm.

FIGS. 1, 6 and 11 are layout diagrams each showing an optical path at a wide-angle end in a zoom lens system according to any of examples 1 to 3 for an object distance of 900 mm. FIGS. 2(a), 7(a) and 12(a) are lens arrangement diagrams at the wide-angle end in the zoom lens system according to examples 1 to 3 for an object distance of 900 mm. FIGS. 2(b), 7(b) and 12(b) are lens arrangement diagrams at an intermediate position in the zoom lens system. FIGS. 2(c), 7(c) and 12(c) are lens arrangement diagrams at a telephoto end in the zoom lens system.

The zoom lens system has different states of the wide-angle end, the intermediate position and the telephoto end. The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as fm=√(fw×ft) (√: square root).

Figure 2:
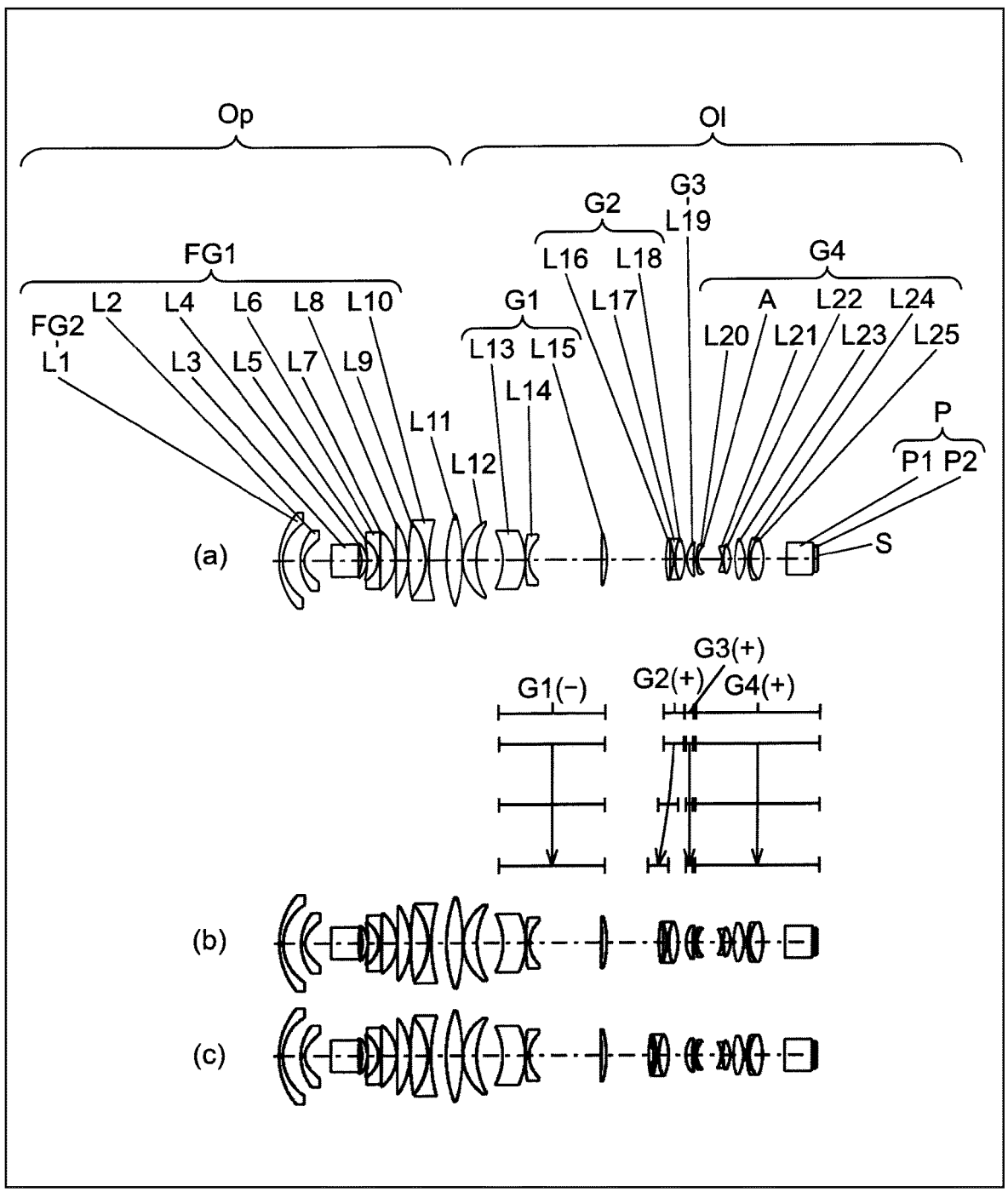
FIG. 2 is a layout diagram of the zoom lens system of example 1 at the wide-angle end for an object distance of 900 mm.

The zoom lens system according to example 1, as shown in FIGS. 1 and 2, includes a first focus lens group FG1, a second focus lens group FG2, a first lens group G1 having a negative power, and a second lens group G2 to a fourth lens group G4 each having a positive power.

Figure 7:
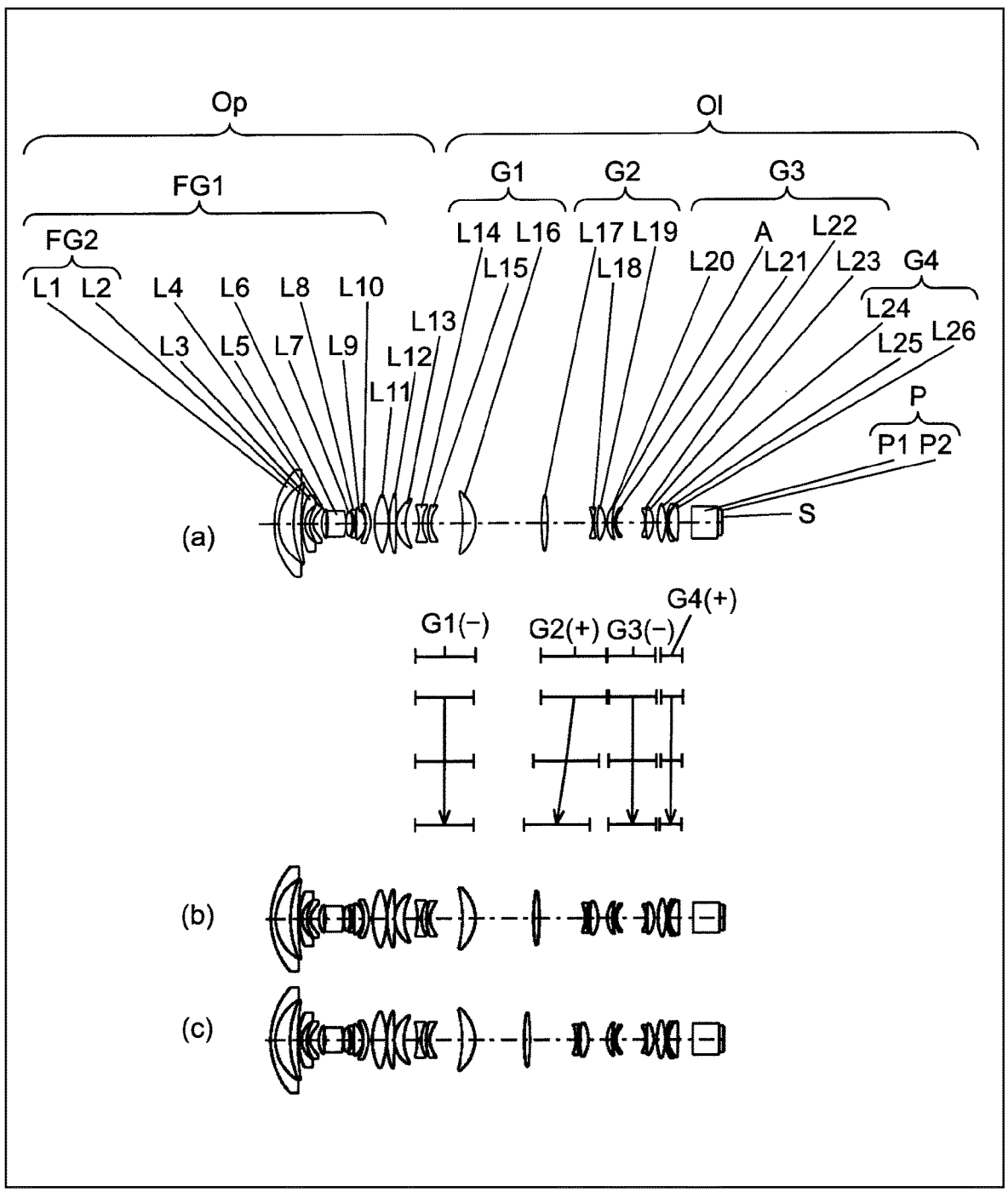
FIG. 7 is a layout diagram of the zoom lens system of example 2 at the wide-angle end for an object distance of 900 mm.

The zoom lens system according to example 2, as shown in FIGS. 6 and 7, includes a first focus lens group FG1, a second focus lens group FG2, a first lens group G1 having a negative power, and a second lens group G2 having a positive power, a third lens group G3 having a negative power, and a fourth lens group G4 having a positive power.

Figure 12:
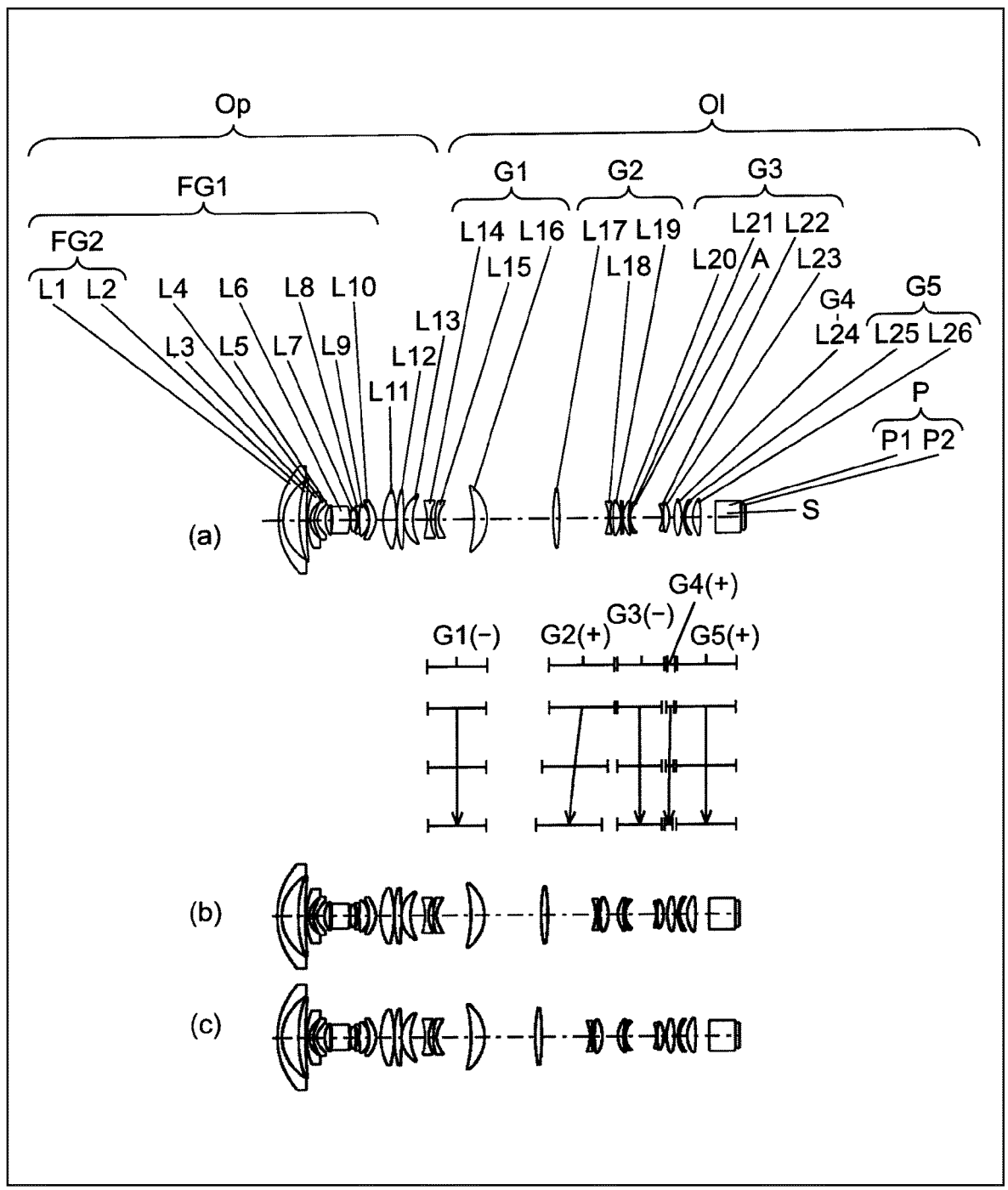
FIG. 12 is a layout diagram of the zoom lens system of example 3 at the wide-angle end for an object distance of 900 mm.

The zoom lens system according to example 3, as shown in FIGS. 11 and 12, includes a first focus lens group FG1, a second focus lens group FG2, a first lens group G1 having a negative power, and a second lens group G2 having a positive power, a third lens group G3 having a negative power, a fourth lens group G4 having a positive power, and a fifth lens group G5 having a positive power.

During zooming the first lens group G1 to the fifth lens group G5 can be fixed or moved independently of each other. The symbols (+) and (−) attached to the reference numerals of the respective lens groups G1 to G5 indicate the positive or negative power of each of the lens groups G1 to G5. Polygonal line arrows shown between each of FIGS. 2(a), 7(a) and 12(a) and each of FIGS. 2(b), 7(b) and 12(b) include straight lines obtained by connecting the positions of the first lens group G1 to the fifth lens group G5 corresponding to each of the states of the wide-angle end, the intermediate position, and the telephoto end ranked in order from the top in the drawing. The wide-angle end and the intermediate position, and the intermediate position and the telephoto end are simply connected by a straight line, which is different from the actual movement of each of the lens groups G1 to G5.

Further, in FIGS. 1, 6 and 11, during focusing, the first focus lens group FG1 can move along the optical axis. During correcting of the field curvature aberration at a magnification conjugate point on the magnification side, the second focus lens group FG2 can move along the optical axis.

In each of the drawings, an imaging position on the magnification side (i.e., the magnification conjugate point) is located on the left side, and an imaging position on the reduction side (i.e., the reduction conjugate point) is located on the right side. Further, in each of the drawings, the straight line drawn closest to the reduction side represents a position of the original image S, and an optical element P is located on the magnification side of the original image S. The optical element P represents different optical elements, such as a prism for color separation and color synthesis, an optical filter, a flat-parallel glass plate, a crystal low-pass filter, and an infrared cut filter.

The zoom lens system according to the examples 1 to 3 internally has an intermediate imaging position MI that is conjugated to the magnification conjugate point on the magnification side and the reduction conjugate point on the reduction side, respectively. Further, in each of the drawings, a magnification optical system Op is positioned on the magnification side with respect to the intermediate imaging position MI, and a relay optical system O1 is positioned on the reduction side with respect to the intermediate imaging position MI.

The magnification optical system Op may have a plurality of focus lens groups, by way of example, the first focus lens group FG1, the second focus lens group FG2, and either lens elements L11 and L12 or lens elements L11, L12 and L13 excluded from any focus lens groups in the examples 1 to 3. The first focus lens group FG1 is composed of a plurality (e.g., ten pieces) of a first lens element L1 to a 10th lens element L10. The first focus lens group FG1 adjusts the focus when an object distance is changed. The second focus lens group FG2 is composed of one or two lens elements, including a part of the lens elements (e.g., the lens element L1) in the first focus lens group FG1. The second focus lens group FG2 corrects the field curvature aberration after focus adjustment by the first focus lens group FG1.

Figure 3:
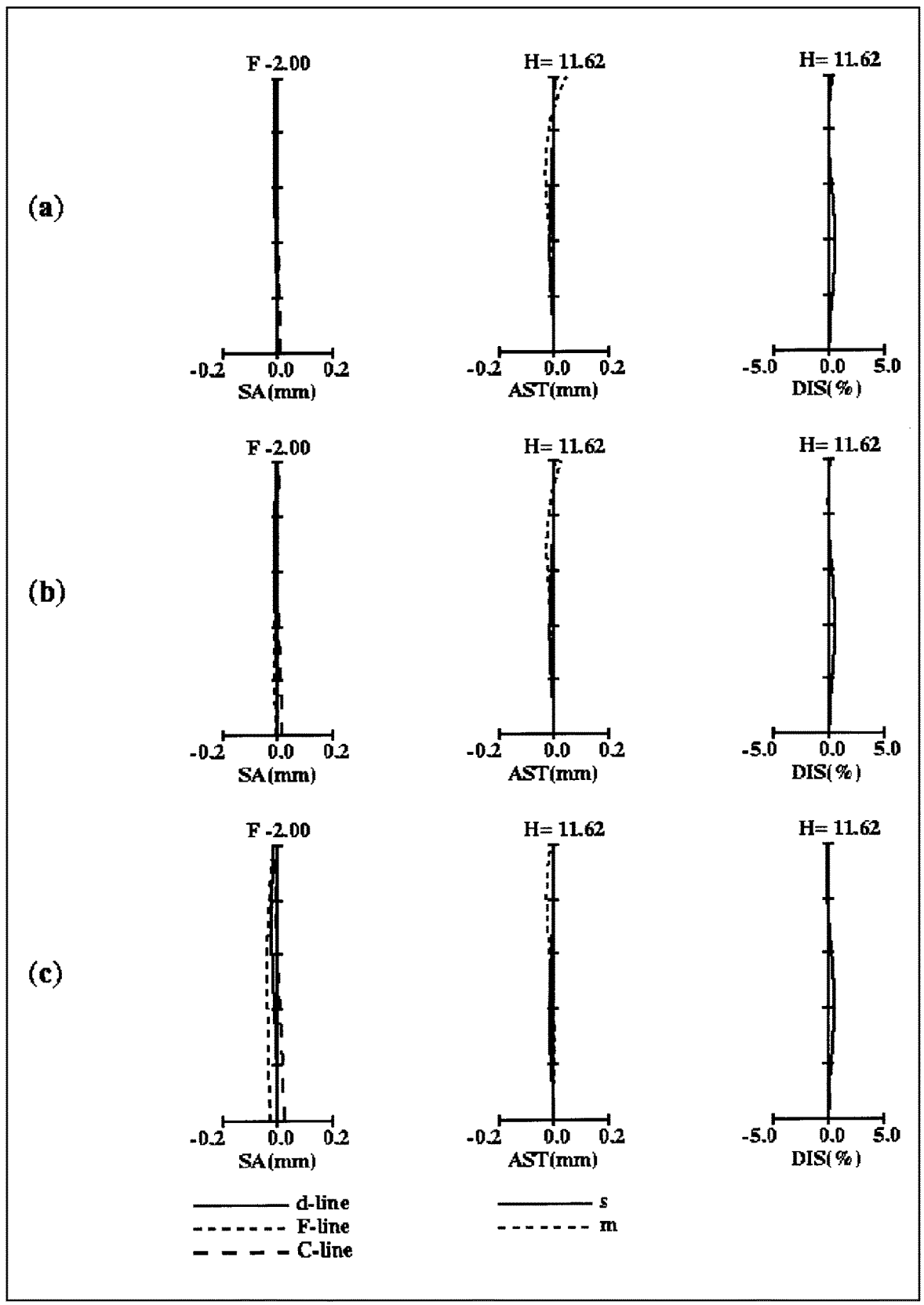
FIG. 3 is a longitudinal aberration diagram of the zoom lens system of example 1 for an object distance of 900 mm.
Figure 4:
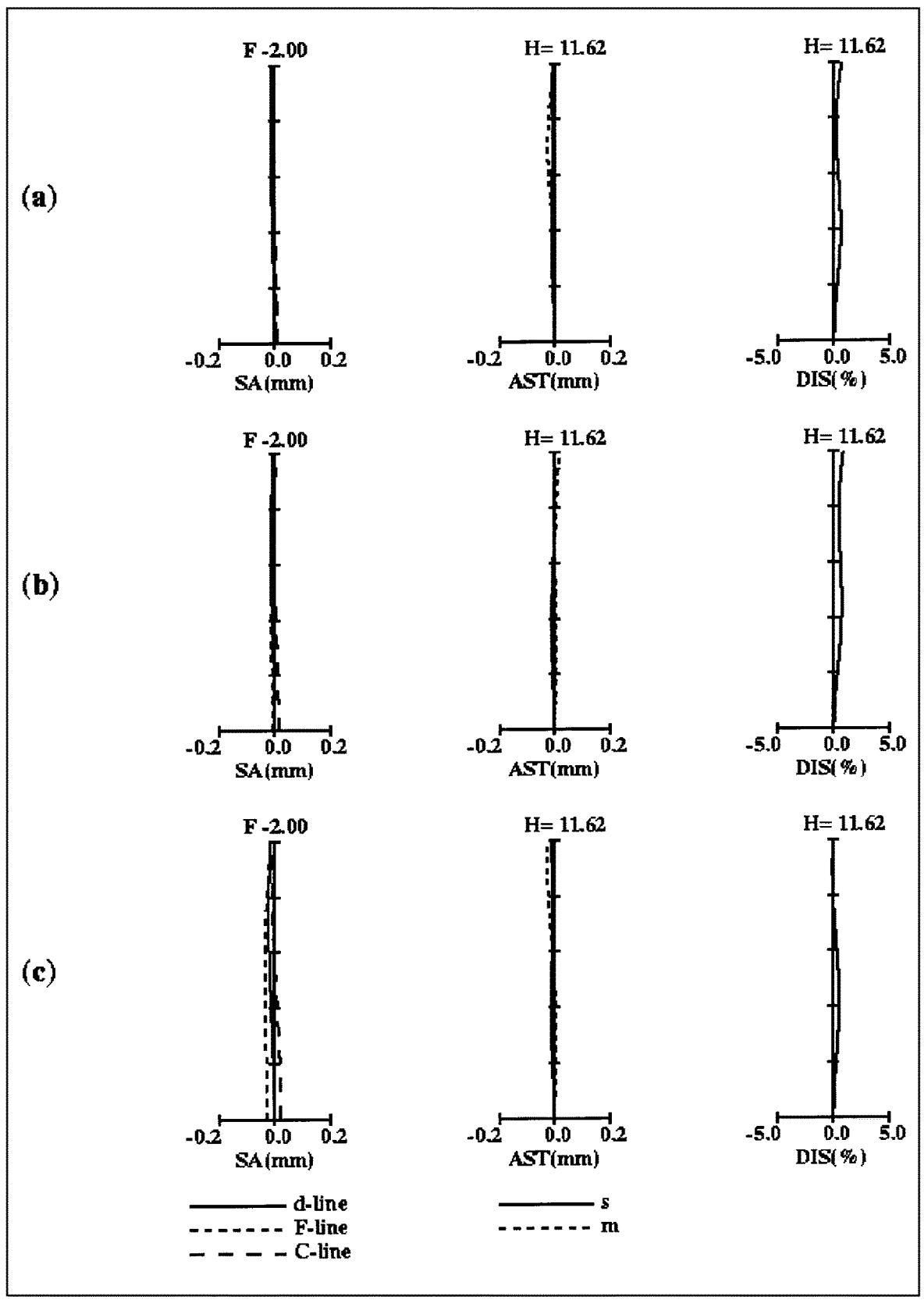
FIG. 4 is a longitudinal aberration diagram of the zoom lens system of example 1 for an object distance of 600 mm.
Figure 5:
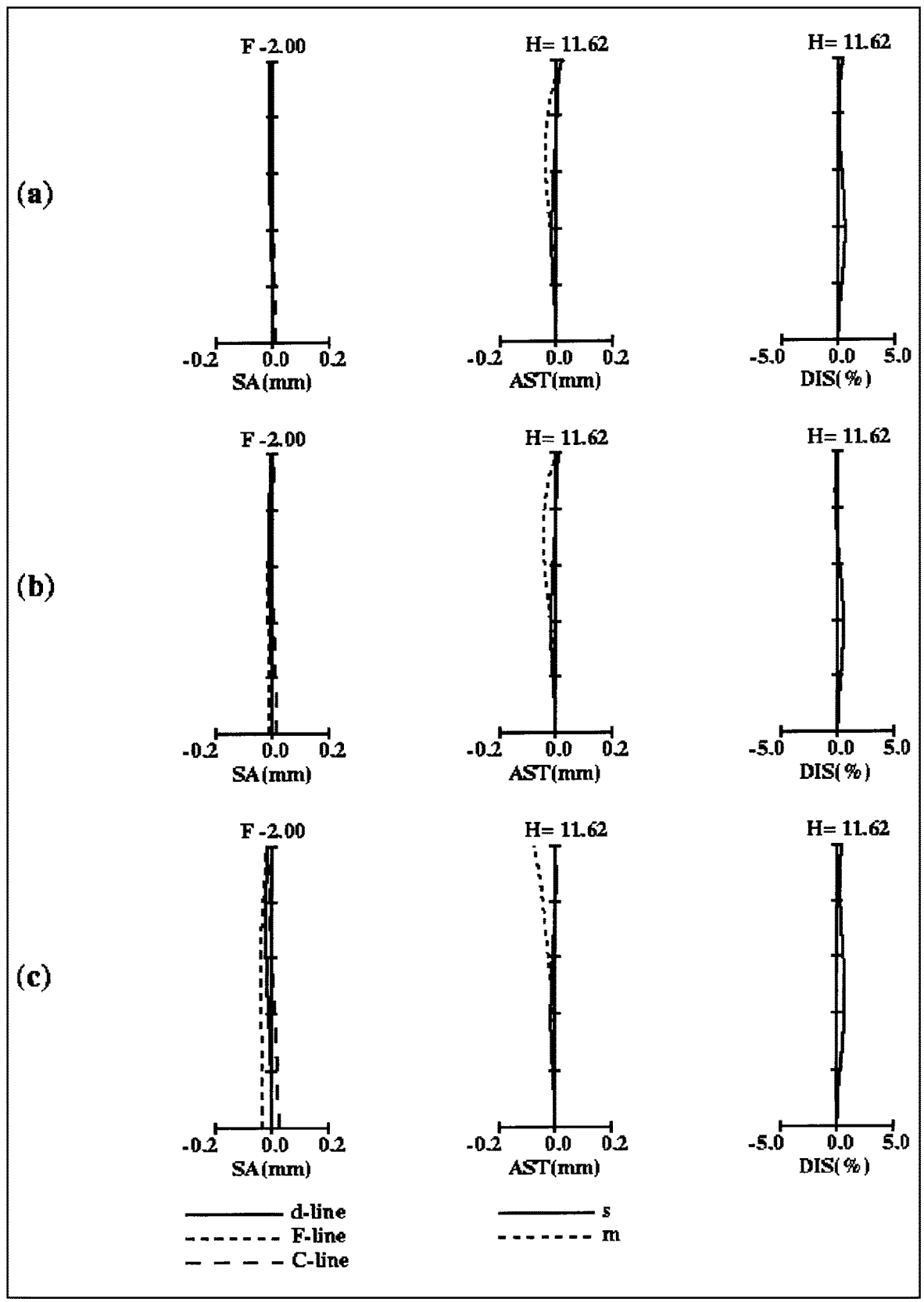
FIG. 5 is a longitudinal aberration diagram of the zoom lens system of example 1 for an object distance of 2400 mm.
Figure 8:
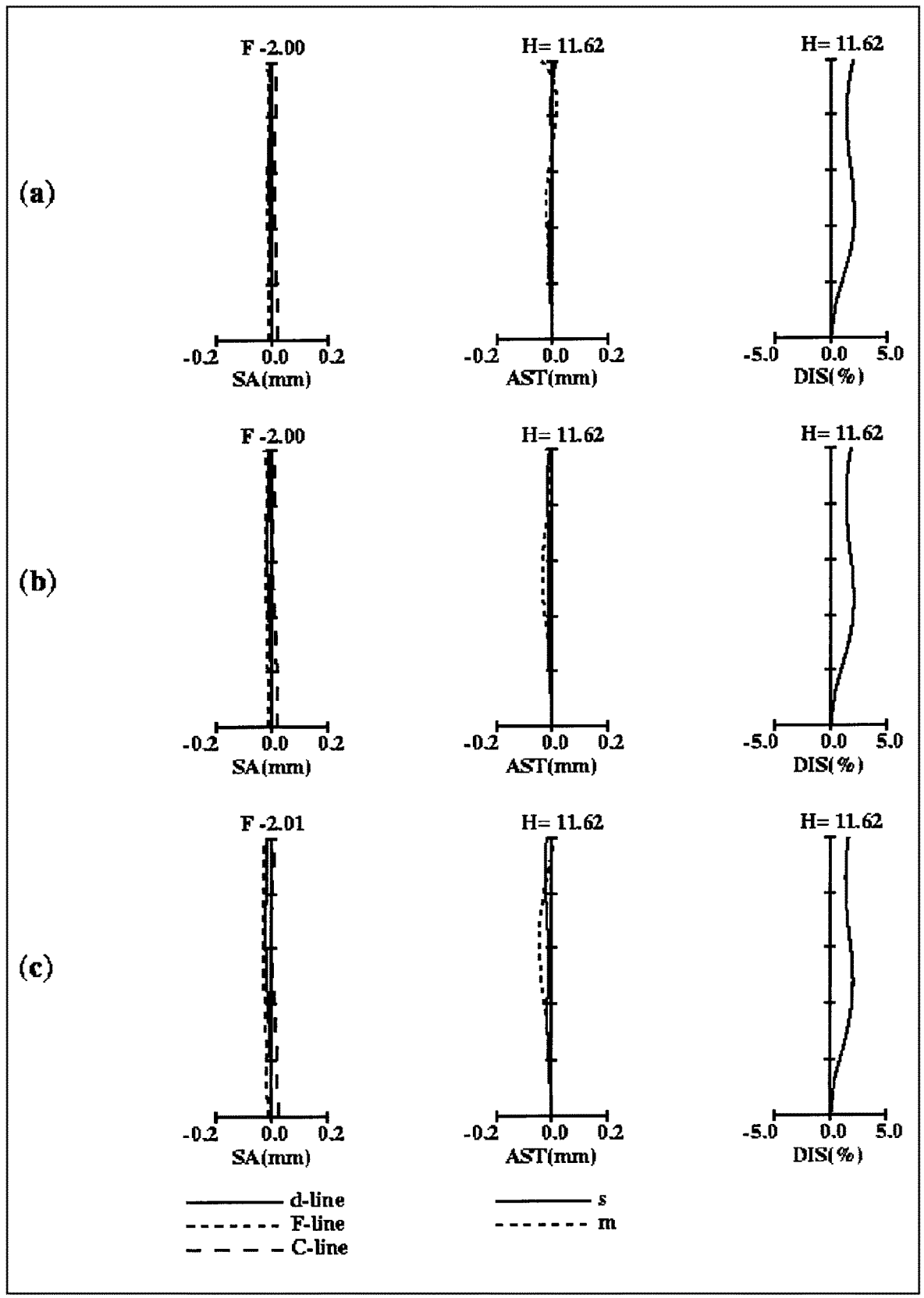
FIG. 8 is a longitudinal aberration diagram of the zoom lens system of example 2 for an object distance of 900 mm.
Figure 9:
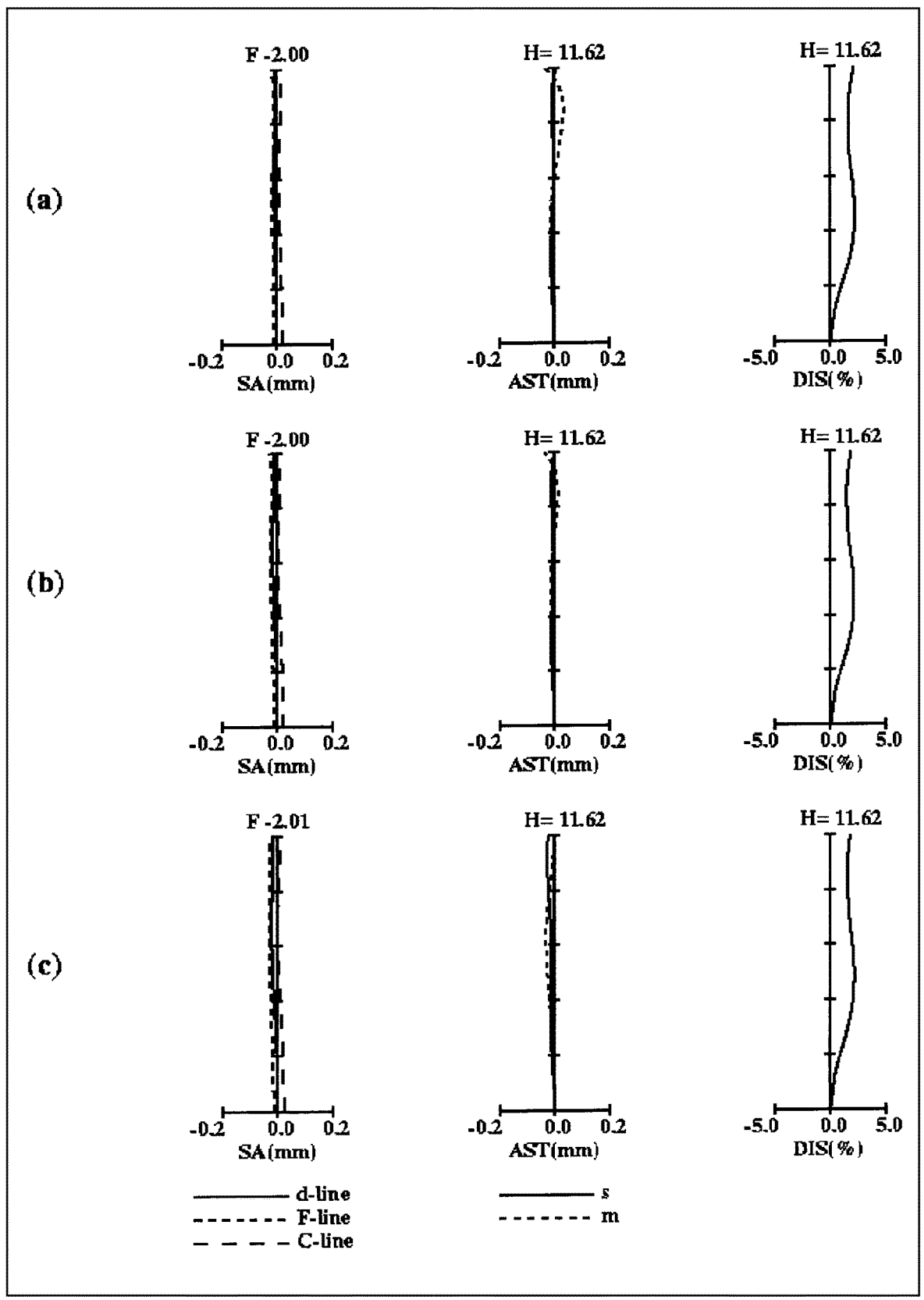
FIG. 9 is a longitudinal aberration diagram of the zoom lens system of example 2 for an object distance of 600 mm.
Figure 10:
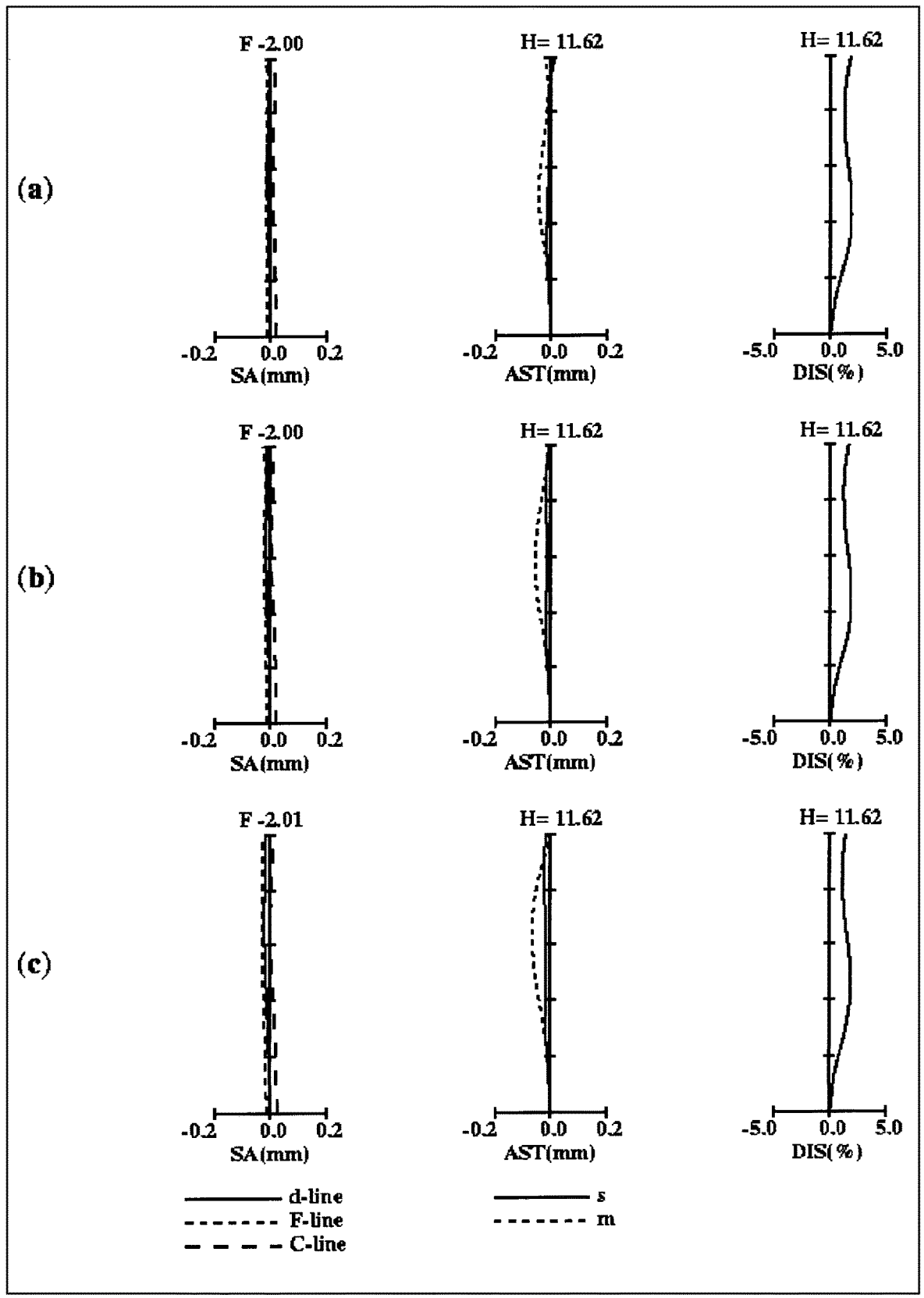
FIG. 10 is a longitudinal aberration diagram of the zoom lens system of example 2 for an object distance of 2400 mm.
Figure 13:
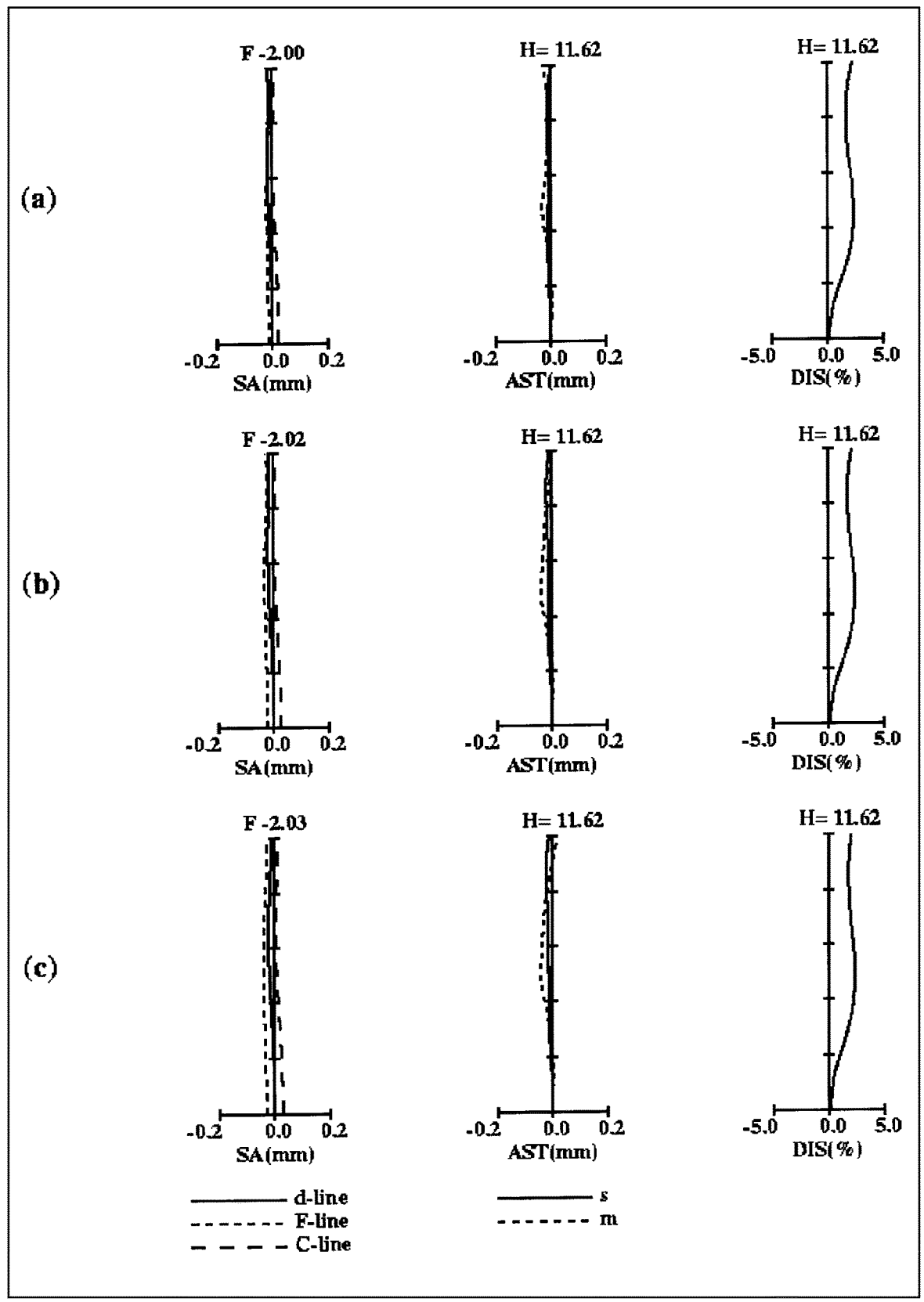
FIG. 13 is a longitudinal aberration diagram of the zoom lens system of example 3 for an object distance of 900 mm.
Figure 14:
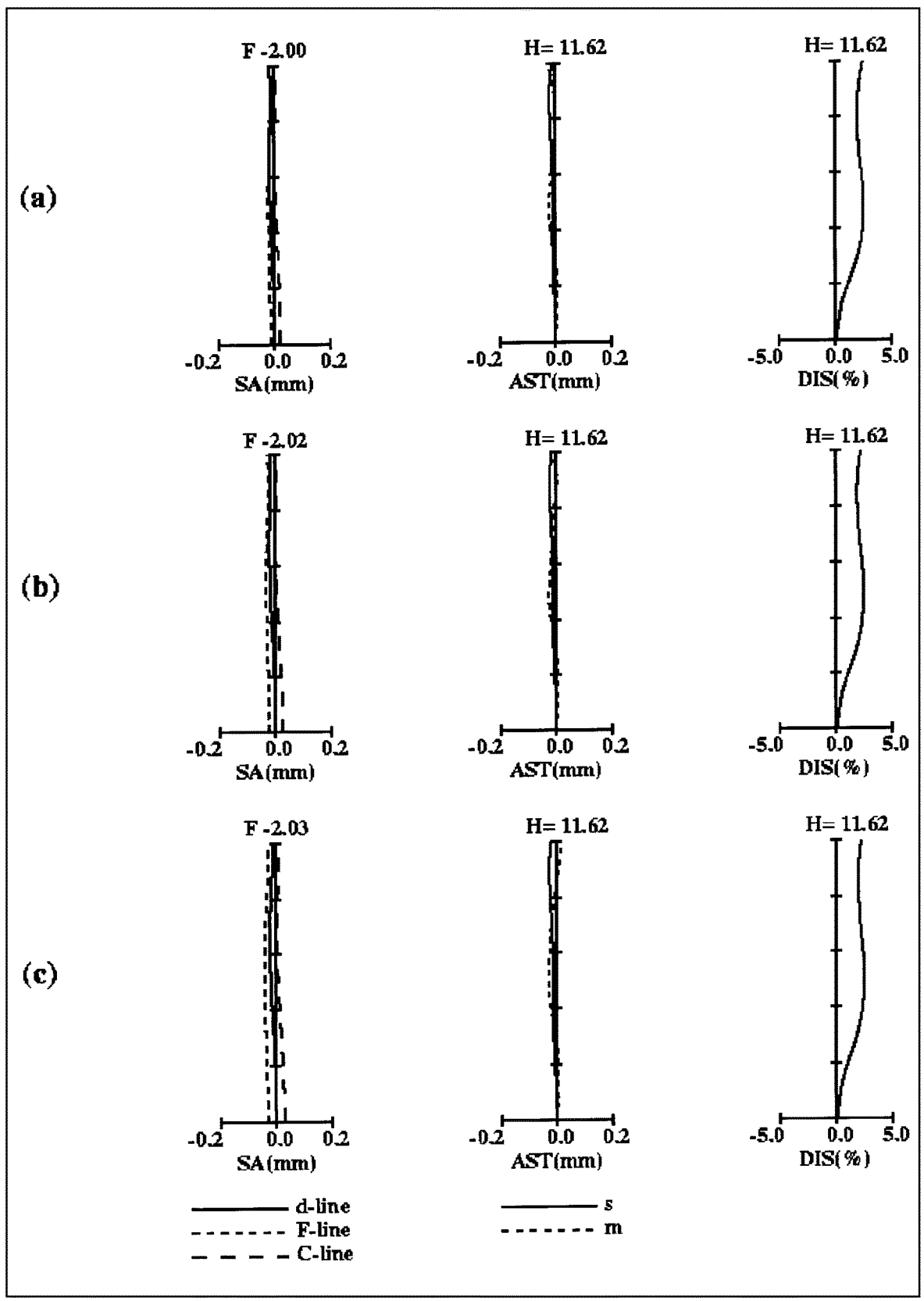
FIG. 14 is a longitudinal aberration diagram of the zoom lens system of example 3 for an object distance of 600 mm.
Figure 15:
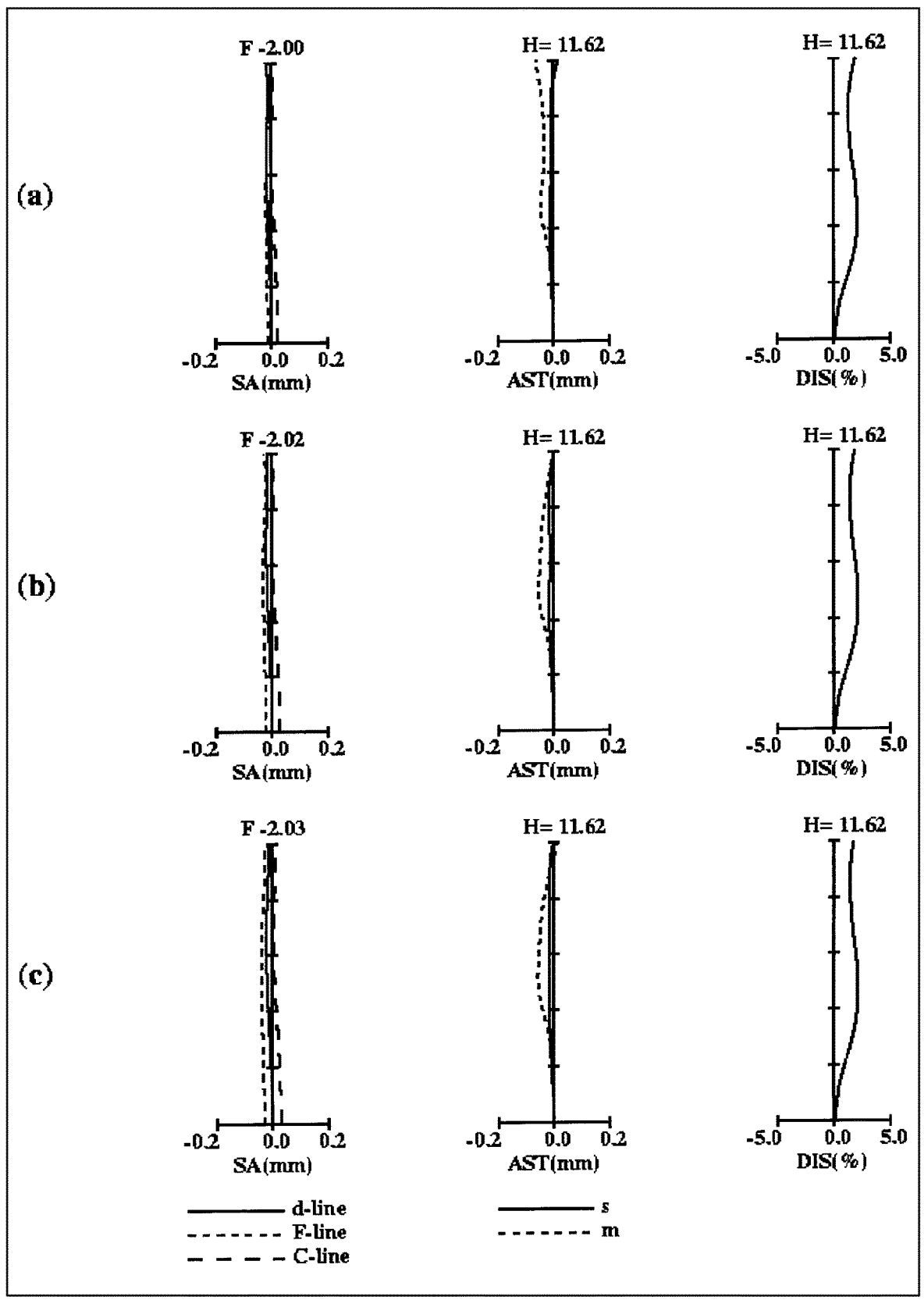
FIG. 15 is a longitudinal aberration diagram of the zoom lens system of example 3 for an object distance of 2400 mm.

FIGS. 3, 8 and 13 are longitudinal aberration diagrams of the zoom lens system according to examples 1 to 3 for an object distance of 900 mm. FIGS. 4, 9 and 14 are longitudinal aberration diagrams of the zoom lens system according to examples 1 to 3 for an object distance of 600 mm. FIGS. 5, 10 and 15 are longitudinal aberration diagrams of the zoom lens according to examples 1 to 3 for an object distance of 2400 mm. FIGS. 3(a) to 5(a), 8(a) to 10(a), 13(a) to 15(a) show longitudinal aberration diagrams at the wide-angle end of the zoom lens system, and FIGS. 3(b) to 5(b), 8(b) to 10(b), 13(b) to 15(b) show longitudinal aberration diagrams at the intermediate position, and FIGS. 3(c) to 5(c), 8(c) to 10(c), 13(c) to 15(c) show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents an F number (indicated by F in the drawing), and a solid line shows the characteristic of the d-line, a short dashed line shows the characteristic of the F-line, and a long dashed line shows the characteristic of the C-line. In the astigmatism diagram, the vertical axis represents an image height, and a solid line shows the characteristic of the sagittal plane (indicated by s in the drawing), and a dashed line shows the characteristic of the meridional plane (indicated by m in the drawing). In the distortion diagram, the vertical axis represents the image height. The distortion represents distortion with respect to equidistant projection.

Example 1

As shown in FIGS. 1 and 2, the zoom lens system according to the example 1 includes the magnification optical system Op and the relay optical system O1. The magnification optical system Op includes the first focus lens group FG1 and the second focus lens group FG2. The relay optical system O1 includes the first lens group G1 to the fourth lens group G4 in this order from the magnification side to the reduction side.

The first focus lens group FG1 is constituted of the first lens element L1 to the 10th lens element L10 in this order from the magnification side to the reduction side, including a surface 1 to a surface 20 (see surface numbers in the numerical examples described later). The first lens element L1 has a negative meniscus shape with the convex surfaces facing the magnification side. The second lens element L2 has a negative meniscus shape with the convex surfaces facing the magnification side. The third lens element L3 has a positive meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a negative meniscus shape with the convex surfaces facing the reduction side. The seventh lens element L7 has a biconvex shape. The eighth lens element L8 has a biconvex shape. The ninth lens element L9 has a biconvex shape. The 10th lens element L10 has a biconcave shape. The second focus lens group FG2 is constituted only of the first lens element L1.

The magnification optical system Op has the 11th lens element L11 to the 12th lens element L12, including a surface 21 to a surface 24, on the reduction side of the first focus lens group FG1 in this order from the magnification side to the reduction side. The 11th lens element L11 has a biconvex shape. The 12th lens element L12 has a positive meniscus shape with the convex surfaces facing the magnification side.

The first lens group G1 having a negative power is constituted of the 13th lens element L13 to the 15th lens element L15 in this order from the magnification side to the reduction side, including a surface 25 to a surface 30. The 13th lens element L13 has a negative meniscus shape with the convex surfaces facing the reduction side. The 14th lens element L14 has a negative meniscus shape with the convex surfaces facing the magnification side. The 15th lens element L15 has a positive meniscus shape with the convex surfaces facing the reduction side.

The second lens group G2 having a positive power is constituted of the 16th lens element L16 to the 18th lens element L18 in this order from the magnification side to the reduction side, including a surface 31 to a surface 36. The 16th lens element L16 has a biconvex shape. The 17th lens element L17 has a biconcave shape. The 18th lens element L18 has a biconvex shape.

The third lens group G3 having a positive power is constituted of the 19th lens element L19, including a surface 37 to a surface 38. The 19th lens element L19 has a positive meniscus shape with the convex surfaces facing the magnification side.

The fourth lens group G4 having a positive power is constituted of the 20th lens element L20 to the 25th lens element L25 in this order from the magnification side to the reduction side, including a surface 39 to a surface 51. The 20th lens element L20 has a negative meniscus shape with the convex surfaces facing the magnification side. The 21th lens element L21 has a biconcave shape. The 22th lens element L22 has a biconvex shape. The 23th lens element L23 has a biconvex shape. The 24th lens element L24 has a negative meniscus shape with the convex surfaces facing the magnification side. The 25th lens element L25 has a biconvex shape.

In the magnification optical system Op, the first focus lens group FG1 (the first lens element L1 to the 10th lens element L10) moves along the optical axis during adjusting the focusing, which may be referred to as focusing adjustment lens group. The second focus lens group FG2 (the first lens element L1) moves along the optical axis during correcting the field curvature aberration, which may be referred to as field curvature correction lens group.

The intermediate imaging position MI is located between the 12th lens element L12 and the 13th lens element L13. Further, an aperture A is arranged between the 20th lens element L20 and the 21st lens element L21. The optical elements P1 and P2 having zero optical power are arranged on the reduction side of the relay optical system O1, and these optical elements correspond to the optical element P.

Example 2

In the example 1 the third lens group G3 in the relay optical system O1 has a positive power, but the present embodiment is not limited thereto. The example 2 exemplifies another zoom lens system wherein the third lens group G3 has a negative power. As shown in FIGS. 6 and 7, the zoom lens system according to the example 2 includes the magnification optical system Op and the relay optical system O1. The magnification optical system Op includes the first focus lens group FG1 and the second focus lens group FG2. The relay optical system O1 includes the first lens group G1 to the fourth lens group G4 in this order from the magnification side to the reduction side.

The first focus lens group FG1 is constituted of the first lens element L1 to the 10th lens element L10 in this order from the magnification side to the reduction side, including a surface 1 to a surface 20. The first lens element L1 has a negative meniscus shape with the convex surfaces facing the magnification side. The second lens element L2 has a positive meniscus shape with the convex surfaces facing the magnification side. The third lens element L3 has a negative meniscus shape with the convex surfaces facing the magnification side. The fourth lens element L4 has a negative meniscus shape with the convex surfaces facing the magnification side. The fifth lens element L5 has a positive meniscus shape with the convex surfaces facing the magnification side. The sixth lens element L6 has a positive meniscus shape with the convex surfaces facing the reduction side. The seventh lens element L7 has a biconvex shape. The eighth lens element L8 has a biconcave shape. The ninth lens element L9 has a positive meniscus shape with the convex surfaces facing the reduction side. The 10th lens element L10 has a positive meniscus shape with the convex surfaces facing the reduction side. The second focus lens group FG2 is constituted of the first lens element L1 and the second lens element L2.

The magnification optical system Op has the 11th lens element L11 to the 13th lens element L13, including a surface 21 to a surface 26, on the reduction side of the first focus lens group FG1 in this order from the magnification side to the reduction side. The 11th lens element L11 has a biconvex shape. The 12th lens element L12 has a biconvex shape. The 13th lens element L13 has a positive meniscus shape with the convex surfaces facing the magnification side.

The first lens group G1 having a negative power is constituted of the 14th lens element L14 to the 16th lens element L16 in this order from the magnification side to the reduction side, including a surface 27 to a surface 32. The 14th lens element L14 has a biconcave shape. The 15th lens element L15 has a negative meniscus shape with the convex surfaces facing the magnification side. The 16th lens element L16 has a positive meniscus shape with the convex surfaces facing the reduction side.

The second lens group G2 having a positive power is constituted of the 17th lens element L17 to the 19th lens element L19 in this order from the magnification side to the reduction side, including a surface 33 to a surface 38. The 17th lens element L17 has a biconvex shape. The 18th lens element L18 has a biconcave shape. The 19th lens element L19 has a biconvex shape.

The third lens group G3 having a negative power is constituted of the 20th lens element L20 to the 23th lens element L23 in this order from the magnification side to the reduction side, including a surface 39 to a surface 47. The 20th lens element L20 has a positive meniscus shape with the convex surfaces facing the magnification side. The 21st lens element L21 has a negative meniscus shape with the convex surfaces facing the magnification side. The 22nd lens element L22 has a biconcave shape. The 23rd lens element L23 has a biconvex shape.

The fourth lens group G4 having a positive power is constituted of the 24th lens element L24 to the 26th lens element L26 in this order from the magnification side to the reduction side, including a surface 48 to a surface 53. The 24th lens element L24 has a biconvex shape. The 25th lens element L25 has a negative meniscus shape with the convex surfaces facing the magnification side. The 26th lens element L26 has a biconvex shape.

In the magnification optical system Op, the first focus lens group FG1 (the first lens element L1 to the 10th lens element L10) moves along the optical axis during adjusting the focusing, which may be referred to as focusing adjustment lens group. The second focus lens group FG2 (the first lens element L1 and the second lens element L2) moves along the optical axis during correcting the field curvature aberration, which may be referred to as field curvature correction lens group.

The intermediate imaging position MI is located between the 13th lens element L13 and the 14th lens element L14. Further, an aperture A is arranged between the 20th lens element L20 and the 21st lens element L21. The optical elements P1 and P2 having zero optical power are arranged on the reduction side of the relay optical system O1, and these optical elements correspond to the optical element P.

Example 3

In the examples 1 and 2 the relay optical system O1 is configured of the first lens group G1 to the fourth lens group G4, but the present embodiment is not limited thereto. The example 3 exemplifies yet another zoom lens system wherein the relay optical system O1 is configured of the first lens group G1 to the fifth lens group G5. As shown in FIGS. 11 and 12, the zoom lens system according to the example 3 includes the magnification optical system Op and the relay optical system O1. The magnification optical system Op includes the first focus lens group FG1 and the second focus lens group FG2. The relay optical system O1 includes the first lens group G1 to the fifth lens group G5 in this order from the magnification side to the reduction side.

The first focus lens group FG1 is constituted of the first lens element L1 to the 10th lens element L10 in this order from the magnification side to the reduction side, including a surface 1 to a surface 20. The first lens element L1 has a negative meniscus shape with the convex surfaces facing the magnification side. The second lens element L2 has a positive meniscus shape with the convex surfaces facing the magnification side. The third lens element L3 has a negative meniscus shape with the convex surfaces facing the magnification side. The fourth lens element L4 has a negative meniscus shape with the convex surfaces facing the magnification side. The fifth lens element L5 has a positive meniscus shape with the convex surfaces facing the magnification side. The sixth lens element L6 has a positive meniscus shape with the convex surfaces facing the reduction side. The seventh lens element L7 has a biconvex shape. The eighth lens element L8 has a biconcave shape. The ninth lens element L9 has a positive meniscus shape with the convex surfaces facing the reduction side. The 10th lens element L10 has a positive meniscus shape with the convex surfaces facing the reduction side. The second focus lens group FG2 is constituted of the first lens element L1 and the second lens element L2.

The magnification optical system Op has the 11th lens element L11 to the 13th lens element L13, including a surface 21 to a surface 26, on the reduction side of the first focus lens group FG1 in this order from the magnification side to the reduction side. The 11th lens element L11 has a biconvex shape. The 12th lens element L12 has a biconvex shape. The 13th lens element L13 has a positive meniscus shape with the convex surfaces facing the magnification side.

The first lens group G1 having a negative power is constituted of the 14th lens element L14 to the 16th lens element L16 in this order from the magnification side to the reduction side, including a surface 27 to a surface 32. The 14th lens element L14 has a biconcave shape. The 15th lens element L15 has a negative meniscus shape with the convex surfaces facing the magnification side. The 16th lens element L16 has a positive meniscus shape with the convex surfaces facing the reduction side.

The second lens group G2 having a positive power is constituted of the 17th lens element L17 to the 19th lens element L19 in this order from the magnification side to the reduction side, including a surface 33 to a surface 38. The 17th lens element L17 has a biconvex shape. The 18th lens element L18 has a biconcave shape. The 19th lens element L19 has a biconvex shape.

The third lens group G3 having a negative power is constituted of the 20th lens element L20 to the 23th lens element L23 in this order from the magnification side to the reduction side, including a surface 39 to a surface 47. The 20th lens element L20 has a positive meniscus shape with the convex surfaces facing the magnification side. The 21st lens element L21 has a negative meniscus shape with the convex surfaces facing the magnification side. The 22nd lens element L22 has a biconcave shape. The 23rd lens element L23 has a biconvex shape.

The fourth lens group G4 having a positive power is constituted of the 24th lens element L24, including a surface 48 to a surface 49. The 24th lens element L24 has a biconvex shape.

The fifth lens group G5 having a positive power is constituted of the 25th lens element L25 to the 26th lens element L26 in this order from the magnification side to the reduction side, including a surface 50 to a surface 53. The 25th lens element L25 has a negative meniscus shape with the convex surfaces facing the magnification side. The 26th lens element L26 has a biconvex shape.

In the magnification optical system Op, the first focus lens group FG1 (the first lens element L1 to the 10th lens element L10) moves along the optical axis during adjusting the focusing, which may be referred to as focusing adjustment lens group. The second focus lens group FG2 (the first lens element L1 and the second lens element L2) moves along the optical axis during correcting the field curvature aberration, which may be referred to as field curvature correction lens group.

The intermediate imaging position MI is located between the 13th lens element L13 and the 14th lens element L14. Further, an aperture A is arranged between the 21st lens element L21 and the 22nd lens element L22. The optical elements P1 and P2 having zero optical power are arranged on the reduction side of the relay optical system O1, and these optical elements correspond to the optical element P.

Outline of Examples 1 to 3

As described above in the examples 1 to 3, the zoom lens system according to the present embodiment internally has an intermediate imaging position MI that is conjugated to the magnification conjugate point on the magnification side and the reduction conjugate point on the reduction side, respectively. Further, the zoom lens system according to examples 1 to 3 includes the magnification optical system Op constituted of the plurality of lens elements, positioned on the magnification side with respect to the intermediate imaging position MI, and the relay optical system O1 constituted of the plurality of lens elements, positioned on the reduction side with respect to the intermediate imaging position MI. In a case the intermediate imaging position MI is located inside a lens element, the lens group located on the magnification side of that lens element belongs to the magnification optical system Op, and the lens group located on the reduction side of the lens element located at the intermediate imaging position belongs to the relay optical system O1. When forming an intermediate imaging of the original image by means of the relay optical system O1, it becomes easy to correct various aberrations, in particular, chromatic aberration of magnification and the like.

The zoom lens system according to the present embodiment may be configured as an interchangeable lens that can be detachably attached to a main body apparatus, such as image projection apparatus or imaging apparatus as described below. In this case, the lens (e.g., the first lens element L1) for correcting the field curvature aberration on the magnification conjugate point on the magnification side is configured so as to adjust the position thereof along the optical axis after attachment to the main body apparatus.

The zoom lens system according to examples 1 to 3 may include not only lens elements having an optical power but also elements having zero or substantially zero optical power, such as mirrors, apertures, masks, cover glasses, filters, prisms, wave plates, and polarizing elements.

Next, conditions which the zoom lens system according to examples 1 to 3 can satisfy are described below. Although a plurality of the conditions are defined for the zoom lens system according to each of the examples, all of these plurality of conditions may be satisfied, or the individual conditions may be satisfied to obtain the corresponding effects.

The zoom lens system according to the present embodiment may be an optical system internally having the intermediate imaging position MI that is conjugated to the magnification conjugate point on the magnification side and the reduction conjugate point on the reduction side, respectively, the optical system may include:

the magnification optical system Op having A (A is an integer of three or more) pieces of the lens elements, positioned on the magnification side with respect to the intermediate imaging position MI; and a relay optical system O1 having B (B is an integer of two or more) pieces of the lens elements, positioned on the reduction side with respect to the intermediate imaging position MI, wherein the first lens group G1 composed of β pieces (β is one or more and less than B) of the lens elements positioned first from the magnification side in the relay optical system O1 may have a negative power.

The above-described configuration can make the angle of light ray with respect to the optical axis smaller on the reduction side from the intermediate imaging position MI, thereby the wide-angle lens is easy to manufacture. Further, the distortion aberration can be corrected by the first lens group G1 having the negative power, thereby the load of correction by the first lens L1 positioned closest to the magnification side can be reduced, and the size thereof can be miniaturized. Further, the distortion can be corrected without using any aspherical lenses in the first lens L1, thereby the manufacturing cost can be reduced.

In the zoom lens system according to the present embodiment, the first lens group G1 may be fixed during zooming.

The above-described configuration can reduce aberration fluctuations that may occur during zooming. In addition, the mechanical design of the zoom lens system becomes simple.

In the zoom lens system according to the present embodiment, the magnification optical system Op may be fixed during zooming, and a part or all of the lens elements of the relay optical system O1 excluding the first lens group G1 may move along the optical axis during zooming.

The above-described configuration can allow the zooming operation without moving the magnification optical system Op having a large size and weight, thereby the zoom mechanism can be reduced in size and weight.

The zoom lens system according to the present embodiment may satisfy the following condition (1):

$$1 < fs1/fw < 100 \tag{1}$$

where, fs1 is a focal length of the first lens group G1, and fw is a focal length of the entire optical system at the wide-angle end.

The condition (1) is a conditional expression for defining the relationship between the focal length of the first lens group G1 and the focal length of the entire optical system at the wide-angle end. When satisfying this condition, a lens system having a wide angle and a small lens diameter can be realized. If exceeding the upper limit of the condition (1), the distortion correction becomes insufficient and good image quality cannot be obtained. On the other hand, if falling below the lower limit, the lens becomes difficult to manufacture.

In addition to the condition (1), more advantageous effects can be obtained by further satisfying at least one of the following conditions (1A) and (1B):

$$fs1/fw > 10 \tag{1A}$$

$$fs1/fw < 50 \tag{1B}$$

In the zoom lens system according to the present embodiment, the lens positioned first from the reduction side in the relay optical system O1 (e.g., corresponding to the 25th lens element L25 in example 1 and the 26th lens element L26 in examples 2 and 3) may be fixed during focusing, and at least the first lens element L1 positioned first from the magnification side in the magnification optical system Op may move along the optical axis during focusing.

According to the above configuration, a space for moving the focus lens group does not need to be provided in the optical system, thereby the total length can be shortened and the front lens diameter can be reduced.

In the zoom lens system according to the present embodiment, the magnification optical system Op may have the first focus lens group FG1 composed of a pieces (a is three or more and less than A) of lens elements including the first lens element L1, and satisfy the following condition (2):

$$2 < |fFG1/fw| < 10 \tag{2}$$

where, fFG1 is a focal length of the first focus lens group FG1, and fw is a focal length of the entire optical system at the wide-angle end.

The condition (2) is a conditional expression for defining the relationship between the focal length of the first focus lens group FG1 and the focal length of the entire optical system at the wide-angle end. When satisfying this condition, an appropriate focus adjustment range can be realized. If exceeding the upper limit, the focus correction becomes insufficient and good image quality cannot be obtained. On the contrary, if falling below the lower limit, the field curvature occurs and good image quality cannot be obtained.

In addition to the condition (2), more advantageous effects can be obtained by further satisfying at least one of the following conditions (2A) and (2B):

$$|fFG1/fw| > 4 \tag{2A}$$

$$|fFG1/fw| < 8 \tag{2B}$$

In the zoom lens system according to the present embodiment, the magnification optical system Op may have the second focus lens group FG2 that corrects the field curvature aberration by moving along the optical axis after the focusing. The second focus lens group FG2 is composed of one or two pieces of lens elements including the first lens element L1.

The above-described configuration can correct the field curvature aberration that occurs after completion of the focusing, thereby high-performance image quality can be obtained.

In the zoom lens system according to the present embodiment, the magnification optical system Op may have the second focus lens group FG2 composed of one or two pieces of lens elements including the first lens element L1, and satisfy the following condition (3):

$$18 < |fFG2/fw| < 120 \tag{3}$$

where, fFG2 is a focal length of the second focus lens group FG2.

The condition (3) is a conditional expression for defining the relationship between the focal length of the second focus lens group FG2 and the focal length of the entire optical system at the wide-angle end. When satisfying this condition, an appropriate focus adjustment range can be realized. If exceeding the upper limit, the focus correction becomes insufficient and good image quality cannot be obtained. On the contrary, if falling below the lower limit, the field curvature occurs and good image quality cannot be obtained.

In addition to the condition (3), more advantageous effects can be obtained by further satisfying at least one of the following conditions (3A) and (3B):

$$|fFG2/fw| > 20 \tag{3A}$$

$$|fFG2/fw| < 100 \tag{3B}$$

In the zoom lens system according to the present embodiment, the relay optical system O1 may be fixed during focusing, and a part or all of the lens elements in the magnification optical system Op may move along the optical axis during focusing.

The above-described configuration can reduce the amount of field curvature aberration occurring during focusing, and good image quality can be obtained.

The zoom lens system according to the present embodiment may satisfy the following condition (4):

$$1.0 < |ff/fw| < 5 \tag{4}$$

where, ff is a focal length of the magnification optical system Op, and fw is a focal length of the entire optical system at the wide-angle end.

The condition (4) is a conditional expression for defining the relationship between the focal length of the magnification optical system Op and the focal length of the entire optical system at the wide-angle end. When satisfying this condition, a good wide-angle zoom lens can be realized. If exceeding the upper limit, the wide-angle lens is difficult to manufacture. On the other hand, if falling below the lower limit, the chromatic aberration of magnification becomes large and good image quality cannot be obtained.

The zoom lens system according to the present embodiment may satisfy the following condition (5):

$$1.5 < |fr/fw| < 5 \qquad (5)$$

where, fr is a focal length of the relay optical system O1 at the wide-angle end, and fw is a focal length of the entire optical system at the wide-angle end.

The condition (5) is a conditional expression for defining the relationship between the focal length of the relay optical system O1 at the wide-angle end and the focal length of the entire optical system at the wide-angle end. When satisfying this condition, a compact zoom lens system can be realized. If exceeding the upper limit, the total length of the zoom lens system becomes long. On the other hand, if falling below the lower limit, the astigmatism becomes difficult to be controlled.

In the zoom lens system according to the present embodiment, the relay optical system may be constituted of any one of: (a) the first lens group having a negative power, the second lens group having a positive power, the third lens group having a positive or negative power, the fourth lens group having a positive power, arranged in order from the magnification side to the reduction side; and (b) the first lens group having a negative power, the second lens group having a positive power, the third lens group having a negative power, the fourth lens group having a positive power, and a fifth lens group having a positive power, arranged in order from the magnification side to the reduction side.

According to the above configuration, the zoom lens system that is compact and has a desired zoom ratio can be realized.

The zoom lens system according to the present embodiment may satisfy the following condition (6):

$$|\omega| > 60 \qquad (6)$$

where, ω is a maximum half angle of view at the wide-angle end.

The condition (6) is a conditional expression for defining the maximum half angle of view at the wide-angle end. When satisfying this condition, the distance from the zoom lens system to the magnification conjugate point on the magnification side can be shortened. If falling below the lower limit, the projection distance becomes long.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 3 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1 + \sqrt{1 - (1+\kappa)(h/r)^2}} + \sum A_n h^n \qquad \text{[Mathematical Formula 1]}$$

where, Z is a distance from a point located on an aspherical surface at a height "h" from the optical axis, to the tangent plane of the aspherical vertex, h is a height from the optical axis, r is a radius of curvature of the vertex, κ is a cone constant, and An is a nth-order aspherical coefficient.

Numerical Example 1

Regarding the zoom lens system of numerical example 1 (corresponding to example 1), Table 1 shows surface data, Table 2 shows various data, Table 3 shows single lens data, and Table 4 shows zoom lens group data.

TABLE 1

| SURFACE NUMBER | r | d | nd | vd |
|---|---|---|---|---|
| Object plane | ∞(infinity) | | | |
| 1 | 70.95120 | 3.50000 | 1.83481 | 42.7 |
| 2 | 43.80140 | 16.27120 | | |
| 3* | 48.65870 | 3.50000 | 1.51633 | 64.1 |
| 4* | 15.20610 | 23.79150 | | |
| 5 | 525.11730 | 25.95590 | 1.61800 | 63.4 |
| 6 | 881.51500 | 2.82520 | | |
| 7* | −42.49710 | 5.28490 | 1.58313 | 59.4 |
| 8* | −22.14280 | 0.20020 | | |
| 9 | −89.95850 | 9.47620 | 1.55032 | 75.5 |
| 10 | −23.16540 | 0.31530 | | |
| 11 | −23.08340 | 2.00000 | 1.80810 | 22.8 |
| 12 | −4607.97460 | 0.43500 | | |
| 13 | 1659.29130 | 13.90850 | 1.59282 | 68.6 |
| 14 | −36.96930 | 0.74230 | | |
| 15 | 10266.35840 | 11.25340 | 1.59282 | 68.6 |
| 16 | −64.36810 | 0.20400 | | |
| 17 | 209.49060 | 16.08830 | 1.43700 | 95.1 |
| 18 | −57.39020 | 0.76370 | | |
| 19 | −54.79270 | 2.50000 | 1.59270 | 35.4 |
| 20 | 137.03320 | 13.76270 | | |
| 21 | 126.83430 | 15.25190 | 1.86966 | 20.0 |
| 22 | −154.46520 | 0.72390 | | |
| 23 | 43.32520 | 12.47050 | 1.86966 | 20.0 |
| 24 | 68.40260 | 24.15100 | | |
| 25 | −57.49090 | 20.82320 | 1.85883 | 30.0 |
| 26 | −63.89760 | 0.36320 | | |
| 27* | −667.89390 | 3.00000 | 1.80998 | 40.9 |
| 28* | 26.91440 | 66.00190 | | |
| 29 | −1254.61490 | 4.85070 | 1.80420 | 46.5 |
| 30 | −93.95470 | variable | | |
| 31 | 112.01550 | 3.95340 | 1.85883 | 30.0 |
| 32 | −565.79860 | 3.05970 | | |
| 33 | −57.17390 | 2.00000 | 1.65412 | 39.7 |
| 34 | 54.08470 | 0.21150 | | |
| 35 | 53.83790 | 9.00580 | 1.55032 | 75.5 |
| 36 | −49.57790 | variable | | |
| 37 | 27.77070 | 6.15940 | 1.59270 | 35.4 |
| 38 | 107.60070 | variable | | |
| 39 | 44.46160 | 1.50000 | 1.51680 | 64.2 |
| 40 | 19.25470 | 5.29340 | | |
| 41(Aperture) | ∞ | 17.26720 | | |
| 42 | −23.71550 | 1.50000 | 1.80610 | 33.3 |
| 43 | 52.17970 | 0.50880 | | |
| 44 | 68.52930 | 6.18540 | 1.43700 | 95.1 |
| 45 | −29.75470 | 3.33090 | | |
| 46 | 61.64940 | 9.52630 | 1.49700 | 81.6 |
| 47 | −41.29800 | 3.03060 | | |
| 48 | 58.93560 | 2.00000 | 1.79952 | 42.2 |
| 49 | 30.88120 | 0.57170 | | |
| 50 | 32.83840 | 11.91270 | 1.49700 | 81.6 |
| 51 | −50.86200 | 20.70000 | | |
| 52 | ∞ | 25.00000 | 1.58913 | 61.3 |

TABLE 1-continued

Surface data

| SURFACE NUMBER | r | d | nd | vd |
|---|---|---|---|---|
| 53 | ∞ | 1.00000 | | |
| 54 | ∞ | 3.00000 | 1.50847 | 61.2 |
| 55 | ∞ | BF | | |
| Image plane | ∞ | | | |

Aspherical Data

3rd Surface
  K=0.00000E+00, A4=7.78139E−07, A6=6.22294E−11, A8=0.00000E+00, A10=0.00000E+00, A12=0.00000E+00

4th Surface
  K=−7.29002E−01, A4=−1.03008E−05, A6=−1.02602E−08, A8=9.72136E−12, A10=−3.41056E−14, A12=2.69059E−18

7th Surface
  K=0.00000E+00, A4=−6.65447E−07, A6=−2.98202E−09, A8=−2.03755E−11, A10=0.00000E+00, A12=0.00000E+00

8th Surface
  K=0.00000E+00, A4=7.29220E−06, A6=1.14483E−08, A8=0.00000E+00, A10=0.00000E+00, A12=0.00000E+00

27th Surface
  K=0.00000E+00, A4=8.16936E−06, A6=−3.75272E−09, A8=1.28334E−12, A10=0.00000E+00, A12=0.00000E+00

28th Surface
  K=0.00000E+00, A4=−3.87007E−07, A6=−5.16193E−09, A8=−7.44821E−13, A10=0.00000E+00, A12=0.00000E+00

TABLE 2

Various data (object distance 900 mm)
Zoom ratio 1.10484

| | WIDE-ANGLE | INTERMEDIATE | TELEPHOTO |
|---|---|---|---|
| Focal length | −5.6818 | −5.8914 | −6.2774 |
| F number | −1.99587 | −1.99582 | −1.99555 |
| Angle of view | −63.8849 | −63.0958 | −61.6670 |
| Image height | 11.6200 | 11.6200 | 11.6200 |
| Lens total length | 495.3918 | 495.3906 | 495.3998 |
| BF | 1.01393 | 1.01268 | 1.02179 |
| d30 | 52.8021 | 47.7296 | 38.9031 |
| d36 | 2.0019 | 7.1524 | 16.1022 |
| d38 | 2.4425 | 2.3645 | 2.2413 |
| Various data (object distance 600 mm) | | | |
| d2 | 16.0985 | 14.6895 | 16.7232 |
| d20 | 14.4198 | 14.3121 | 14.4000 |
| Various data (object distance 2400 mm) | | | |
| d2 | 14.8217 | 15.7612 | 13.5430 |
| d20 | 13.0724 | 13.0993 | 13.2365 |

TABLE 3

Single lens data

| Lens element | First surface | Focal length |
|---|---|---|
| 1 | 1 | −145.6613 |
| 2 | 3 | −44.4197 |
| 3 | 5 | 2044.7879 |
| 4 | 7 | 72.3613 |
| 5 | 9 | 53.9752 |
| 6 | 11 | −28.7146 |
| 7 | 13 | 61.1889 |
| 8 | 15 | 107.9460 |
| 9 | 17 | 105.0118 |
| 10 | 19 | −65.7208 |
| 11 | 21 | 82.1563 |
| 12 | 23 | 110.3604 |
| 13 | 25 | 1330.7619 |
| 14 | 27 | −31.8798 |
| 15 | 29 | 126.0528 |
| 16 | 31 | 109.1672 |
| 17 | 33 | −42.1899 |
| 18 | 35 | 48.3959 |
| 19 | 37 | 61.3910 |
| 20 | 39 | −67.0776 |
| 21 | 42 | −20.0501 |
| 22 | 44 | 48.4015 |
| 23 | 46 | 51.3381 |
| 24 | 48 | −83.7958 |
| 25 | 50 | 42.1420 |

TABLE 4

Zoom lens group data

| Group | First surface | Focal length |
|---|---|---|
| 0 | 1 | 14.480 |
| 1 | 25 | −143.417 |
| 2 | 31 | 135.991 |
| 3 | 37 | 61.391 |
| 4 | 39 | 49.004 |

Numerical Example 2

Regarding the zoom lens system of numerical example 2 (corresponding to example 2), Table 5 shows surface data, Table 6 shows various data, Table 7 shows single lens data, and Table 8 shows zoom lens group data.

TABLE 5

Surface data

| SURFACE NUMBER | r | d | nd | vd |
|---|---|---|---|---|
| Object plane | ∞(infinity) | | | |
| 1 | 77.74810 | 4.50000 | 1.90366 | 31.3 |
| 2 | 45.02530 | 13.89470 | | |
| 3 | 95.07980 | 7.46330 | 1.72342 | 38.0 |
| 4 | 255.20960 | 1.20000 | | |
| 5 | 71.36640 | 2.50000 | 1.80420 | 46.5 |
| 6 | 21.00780 | 4.52040 | | |
| 7* | 23.39160 | 3.20000 | 1.80998 | 40.9 |
| 8* | 11.55090 | 8.10340 | | |
| 9 | 26.88930 | 4.96960 | 1.80610 | 33.3 |
| 10 | 272.90290 | 1.33220 | | |
| 11 | −77.54890 | 17.11470 | 1.61800 | 63.4 |
| 12 | −42.27460 | 0.20000 | | |
| 13 | 35.18170 | 6.05530 | 1.49700 | 81.6 |
| 14 | −43.00420 | 1.78790 | | |
| 15 | −24.99520 | 1.00000 | 1.86966 | 20.0 |
| 16 | 109.98400 | 1.06550 | | |
| 17 | −472.83790 | 8.47180 | 1.49700 | 81.6 |
| 18 | −19.65040 | 0.20000 | | |
| 19* | −37.26990 | 5.20710 | 1.68948 | 31.0 |
| 20* | −25.00000 | 3.49930 | | |
| 21 | 63.03220 | 13.32980 | 1.49700 | 81.6 |
| 22 | −75.40430 | 0.20000 | | |

TABLE 5-continued

Surface data

| SURFACE NUMBER | r | d | nd | vd |
|---|---|---|---|---|
| 23 | 81.08640 | 7.34610 | 1.92286 | 20.9 |
| 24 | −873.63600 | 0.20000 | | |
| 25 | 27.96110 | 8.55070 | 1.92286 | 20.9 |
| 26 | 46.18150 | 12.93050 | | |
| 27 | −58.54250 | 3.48510 | 1.80809 | 22.8 |
| 28 | 31.42850 | 5.02200 | | |
| 29* | 500.00000 | 3.00000 | 1.68948 | 31.0 |
| 30* | 21.84910 | 30.57940 | | |
| 31 | −112.49700 | 12.20850 | 1.83481 | 42.7 |
| 32 | −39.71210 | variable | | |
| 33 | 179.50050 | 5.67980 | 1.80610 | 33.3 |
| 34 | −200.27300 | 43.18710 | | |
| 35 | −40.17420 | 1.50000 | 1.73800 | 32.3 |
| 36 | 69.21510 | 2.88320 | | |
| 37 | 88.10550 | 7.76180 | 1.55032 | 75.5 |
| 38 | −33.88690 | variable | | |
| 39 | 26.29340 | 4.96630 | 1.59270 | 35.4 |
| 40 | 61.82780 | 1.92800 | | |
| 41(Aperture) | ∞ | 0.25840 | | |
| 42 | 25.66670 | 1.50000 | 1.56883 | 56.0 |
| 43 | 17.77300 | 27.75870 | | |
| 44 | −24.29060 | 1.00000 | 1.73800 | 32.3 |
| 45 | 591.07320 | 0.20000 | | |
| 46 | 129.09770 | 6.83160 | 1.43700 | 95.1 |
| 47 | −29.68620 | variable | | |
| 48 | 52.76500 | 7.94360 | 1.49700 | 81.6 |
| 49 | −52.76500 | 0.20000 | | |
| 50 | 38.76670 | 1.50000 | 1.73800 | 32.3 |
| 51 | 22.52490 | 1.42840 | | |
| 52 | 24.36750 | 9.06640 | 1.43700 | 95.1 |
| 53 | −270.40960 | variable | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | BF | | |
| Image plane | ∞ | | | |

Aspherical Data

7th Surface

K=0.00000E+00, A4=−9.46159E−06, A6=−5.93665E−08, A8=2.59365E−11, A10=0.00000E+00, A12=0.00000E+00

8th Surface

K=−8.29046E−01, A4=−2.04827E−05, A6=−1.44054E−07, A8=−2.39467E−10, A10=1.48290E−12, A12=0.00000E+00

19th Surface

K=0.00000E+00, A4=1.63319E−05, A6=−1.25916E−07, A8=2.56894E−10, A10=−8.18906E−13, A12=2.03635E−15

20th Surface

K=0.00000E+00, A4=2.92131E−05, A6=−2.07775E−08, A8=−1.05659E−10, A10=3.78200E−13, A12=−2.31438E−17

29th Surface

K=0.00000E+00, A4=6.25077E−05, A6=−1.55377E−07, A8=8.15590E−11, A10=0.00000E+00, A12=0.00000E+00

30th Surface

K=0.00000E+00, A4=3.16767E−06, A6=−1.09870E−07, A8=3.77124E−11, A10=0.00000E+00, A12=0.00000E+00

TABLE 6

Various data (object distance 900 mm)
Zoom ratio 1.07079

| | WIDE-ANGLE | INTERMEDIATE | TELEPHOTO |
|---|---|---|---|
| Focal length | −4.1412 | −4.2730 | −4.4343 |
| F number | −2.00004 | −2.00185 | −2.00526 |
| Angle of view | −70.0280 | −69.4752 | −68.8020 |
| Image height | 11.6200 | 11.6200 | 11.6200 |
| Lens total length | 430.0116 | 430.0199 | 430.0233 |
| BF | 1.01173 | 1.02018 | 1.02352 |
| d32 | 62.6930 | 55.7106 | 47.0668 |
| d38 | 2.0067 | 8.9890 | 17.6328 |
| d47 | 3.8696 | 3.4418 | 2.8476 |
| d53 | 12.7000 | 13.1277 | 13.7220 |
| Various data (object distance 600 mm) | | | |
| d4 | 1.1249 | 0.9541 | 1.0709 |
| d20 | 3.6565 | 3.5501 | 3.6513 |
| Various data (object distance 2400 mm) | | | |
| d4 | 1.4128 | 1.4016 | 1.3543 |
| d20 | 3.3687 | 3.3440 | 3.3182 |

TABLE 7

Single lens data

| Lens element | First surface | Focal length |
|---|---|---|
| 1 | 1 | −126.6514 |
| 2 | 3 | 205.4518 |
| 3 | 5 | −37.8578 |
| 4 | 7 | −32.0484 |
| 5 | 9 | 36.6726 |
| 6 | 11 | 126.8745 |
| 7 | 13 | 39.9630 |
| 8 | 15 | −23.3386 |
| 9 | 17 | 40.9982 |
| 10 | 19 | 93.8787 |
| 11 | 21 | 71.3615 |
| 12 | 23 | 80.6998 |
| 13 | 25 | 62.6772 |
| 14 | 27 | −24.8759 |
| 15 | 29 | −33.2223 |
| 16 | 31 | 68.3117 |
| 17 | 33 | 118.2179 |
| 18 | 35 | −34.2449 |
| 19 | 37 | 45.4994 |
| 20 | 39 | 73.3710 |
| 21 | 42 | −109.1118 |
| 22 | 44 | −31.5931 |
| 23 | 46 | 55.9634 |
| 24 | 48 | 54.4444 |
| 25 | 50 | −75.8238 |
| 26 | 52 | 51.6343 |

TABLE 8

Zoom lens group data

| Group | First surface | Focal length |
|---|---|---|
| 0 | 1 | 8.021 |
| 1 | 27 | −72.576 |
| 2 | 33 | 181.924 |
| 3 | 39 | −390.626 |
| 4 | 48 | 41.871 |

Numerical Example 3

Regarding the zoom lens system of numerical example 3 (corresponding to example 3), Table 9 shows surface data, Table 10 shows various data, Table 11 shows single lens data, and Table 12 shows zoom lens group data.

TABLE 9

Surface data

| SURFACE NUMBER | r | d | nd | vd |
|---|---|---|---|---|
| Object plane | ∞(infinity) | | | |
| 1 | 77.35680 | 4.50000 | 1.90366 | 31.3 |
| 2 | 45.35000 | 15.37620 | | |
| 3 | 117.22100 | 6.64100 | 1.72342 | 38.0 |
| 4 | 357.27670 | 1.20000 | | |
| 5 | 72.82250 | 2.50000 | 1.80420 | 46.5 |
| 6 | 20.97170 | 3.64890 | | |
| 7* | 22.78400 | 3.20000 | 1.80835 | 40.5 |
| 8* | 11.32450 | 7.77930 | | |
| 9 | 25.82080 | 5.23310 | 1.80610 | 33.3 |
| 10 | 247.64120 | 1.29530 | | |
| 11 | −88.70210 | 16.92680 | 1.61800 | 63.4 |
| 12 | −44.74140 | 0.26670 | | |
| 13 | 39.00520 | 5.82740 | 1.49700 | 81.6 |
| 14 | −37.01570 | 1.83080 | | |
| 15 | −22.33930 | 1.00000 | 1.86966 | 20.0 |
| 16 | 111.70460 | 0.55020 | | |
| 17 | 241.88920 | 8.96680 | 1.49700 | 81.6 |
| 18 | −20.31030 | 0.20000 | | |
| 19* | −38.78930 | 6.10080 | 1.68948 | 31.0 |
| 20* | −22.74690 | 4.53830 | | |
| 21 | 57.35460 | 12.74640 | 1.49700 | 81.6 |
| 22 | −107.10550 | 0.20000 | | |
| 23 | 105.16740 | 6.67620 | 1.92286 | 20.9 |
| 24 | −415.68090 | 0.20000 | | |
| 25 | 28.40960 | 8.49730 | 1.92286 | 20.9 |
| 26 | 47.09320 | 13.97940 | | |
| 27 | −53.09050 | 3.50100 | 1.80809 | 22.8 |
| 28 | 35.15890 | 4.32390 | | |
| 29* | 800.00000 | 3.00000 | 1.68948 | 31.0 |
| 30* | 21.53670 | 32.93260 | | |
| 31 | −115.89550 | 12.46150 | 1.83481 | 42.7 |
| 32 | −41.25100 | variable | | |
| 33 | 163.33330 | 6.05690 | 1.80610 | 33.3 |
| 34 | −239.36770 | 45.74010 | | |
| 35 | −39.74640 | 1.50000 | 1.73800 | 32.3 |
| 36 | 73.15440 | 2.88220 | | |
| 37 | 91.16250 | 7.59340 | 1.55032 | 75.5 |
| 38 | −34.24440 | variable | | |
| 39 | 26.16370 | 5.06400 | 1.59270 | 35.4 |
| 40 | 59.36350 | 0.20000 | | |
| 41 | 27.00310 | 1.50000 | 1.56883 | 56.0 |
| 42 | 18.77120 | 6.32640 | | |
| 43(Aperture) | ∞ | 23.30180 | | |
| 44 | −26.52390 | 1.00000 | 1.73800 | 32.3 |
| 45 | 123.72910 | 0.20000 | | |
| 46 | 99.89040 | 5.78870 | 1.43700 | 95.1 |
| 47 | −31.29320 | variable | | |
| 48 | 46.73430 | 7.56330 | 1.49700 | 81.6 |
| 49 | −58.81010 | variable | | |
| 50 | 33.94250 | 1.50000 | 1.73800 | 32.3 |
| 51 | 23.40390 | 7.04020 | | |
| 52 | 30.42230 | 7.98620 | 1.43700 | 95.1 |
| 53 | −136.37580 | 12.70000 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| 58 | ∞ | BF | | |
| Image plane | ∞ | | | |

Aspherical Data

7th Surface
  K=0.00000E+00, A4=7.49149E−07, A6=−8.14968E−08, A8=2.48225E−11, A10=0.00000E+00
8th Surface
  K=−7.80983E−01, A4=−7.67498E−06, A6=−1.35416E−07, A8=−6.99810E−10, A10=2.49483E−12
19th Surface
  K=0.00000E+00, A4=3.04154E−06, A6=−7.32504E−08, A8=−1.34292E−11, A10=5.48971E−13
20th Surface
  K=0.00000E+00, A4=2.15586E−05, A6=−5.38942E−09, A8=−1.00368E−10, A10=4.46874E−13
29th Surface
  K=0.00000E+00, A4=7.02934E−05, A6=−1.77729E−07, A8=1.07323E−10, A10=0.00000E+00
30th Surface
  K=0.00000E+00, A4=4.63496E−06, A6=−1.09151E−07, A8=2.42157E−11, A10=0.00000E+00

TABLE 10

Various data (object distance 900 mm)
Zoom ratio 1.06987

| | WIDE-ANGLE | INTERMEDIATE | TELEPHOTO |
|---|---|---|---|
| Focal length | −4.1301 | −4.2881 | −4.4187 |
| F number | −2.00011 | −2.01707 | −2.03311 |
| Angle of view | −70.0368 | −69.3592 | −68.7973 |
| Image height | 11.6200 | 11.6200 | 11.6200 |
| Lens total length | 440.0173 | 440.0240 | 440.0253 |
| BF | 0.01752 | 0.02418 | 0.02559 |
| d32 | 61.5627 | 54.4809 | 48.8203 |
| d38 | 2.1187 | 9.2006 | 14.8611 |
| d47 | 4.2751 | 3.4179 | 2.6525 |
| d49 | 2.0000 | 2.8572 | 3.6226 |

Various data (object distance 600 mm)

| | | | |
|---|---|---|---|
| d4 | 1.1679 | 1.0825 | 1.1021 |
| d20 | 4.7735 | 4.7070 | 4.7289 |

Various data (object distance 2400 mm)

| | | | |
|---|---|---|---|
| d4 | 1.2437 | 1.3139 | 1.2991 |
| d20 | 4.2659 | 4.2866 | 4.2733 |

TABLE 11

Single lens data

| Lens element | First surface | Focal length |
|---|---|---|
| 1 | 1 | −129.9651 |
| 2 | 3 | 238.3940 |
| 3 | 5 | −37.4297 |
| 4 | 7 | −31.8265 |
| 5 | 9 | 35.3878 |
| 6 | 11 | 127.3510 |
| 7 | 13 | 39.2118 |
| 8 | 15 | −21.3323 |
| 9 | 17 | 38.1334 |
| 10 | 19 | 69.0537 |
| 11 | 21 | 77.1412 |
| 12 | 23 | 91.5112 |
| 13 | 25 | 63.6914 |
| 14 | 27 | −25.7187 |
| 15 | 29 | −32.1509 |
| 16 | 31 | 71.3051 |
| 17 | 33 | 121.2534 |
| 18 | 35 | −34.7010 |
| 19 | 37 | 46.2278 |
| 20 | 39 | 74.6911 |
| 21 | 41 | −115.9068 |
| 22 | 44 | −29.5124 |
| 23 | 46 | 55.2687 |
| 24 | 48 | 53.6730 |
| 25 | 50 | −108.7095 |
| 26 | 52 | 57.7598 |

TABLE 12

Zoom lens group data

| Group | First surface | Focal length |
|---|---|---|
| 0 | 1 | 8.185 |
| 1 | 27 | −73.241 |
| 2 | 33 | 188.326 |
| 3 | 39 | −231.209 |
| 4 | 48 | 53.673 |
| 5 | 50 | 110.200 |

Table 13 below shows the corresponding values of the respective conditional expressions in the respective numerical examples.

TABLE 13

| Condition | Example 1 | Example 2 | Example 3 |
|---|---|---|---|
| (1) | 25.43678383 | 17.52523423 | 17.73339629 |
| (2) | 6.896449756 | 5.571501014 | 4.979806784 |
| (3) | 25.50173376 | 88.61441128 | 76.1582044 |
| (4) | 2.524527837 | 1.936875785 | 1.981792208 |
| (5) | 2.797722352 | 3.264850768 | 3.376358926 |
| (6) | 63.8849 | 70.028 | 70.0368 |

Second Embodiment

Figure 16:
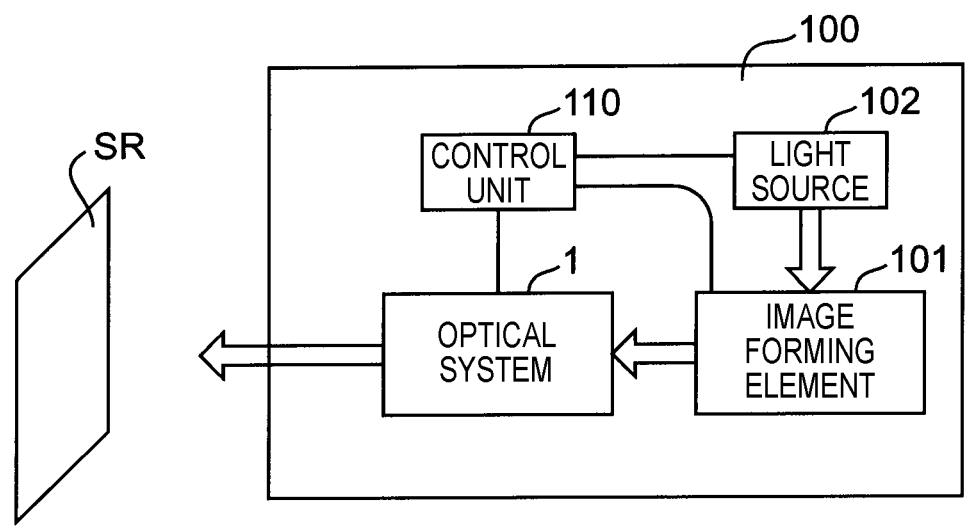
FIG. 16 is a block diagram showing an example of an image projection apparatus according to the present disclosure.

Hereinafter, a second embodiment of the present disclosure is described with reference to FIG. 16. FIG. 16 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while reducing costs by employing the optical system 1 according to the first embodiment.

Third Embodiment

Figure 17:
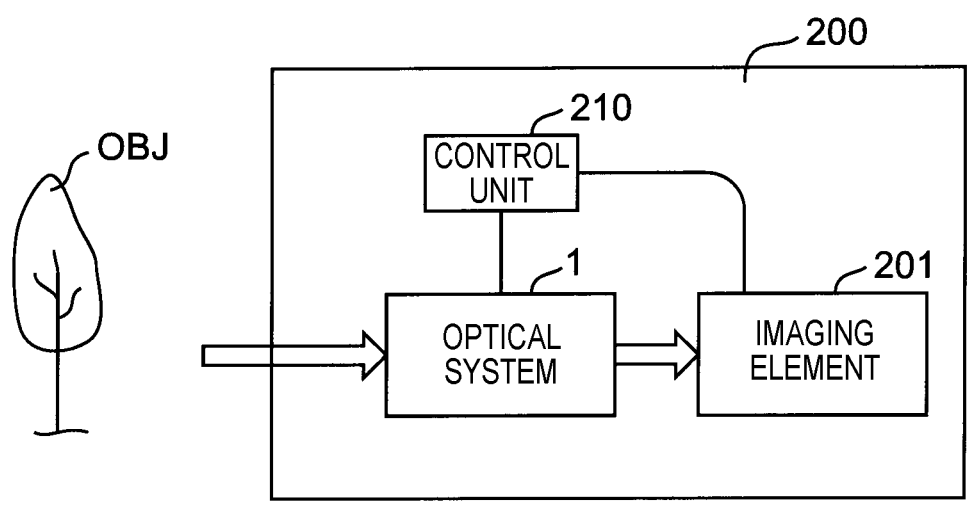
FIG. 17 is a block diagram showing an example of an imaging apparatus according to the present disclosure.

Hereinafter, a third embodiment of the present disclosure is described with reference to FIG. 17. FIG. 17 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as an interchangeable lens that can be detachably attached to the imaging apparatus 200. In this case, a apparatus in which the optical system 1 is removed from the imaging apparatus 200 is an example of a main body apparatus.

The image projection apparatus 100 described above can realize a wide-angle zoom function while reducing costs by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position MI that is conjugated to a magnification conjugate point on a magnification side and a reduction conjugate point on a reduction side, respectively, the optical system including:
  a magnification optical system having A (A is an integer of three or more) pieces of lens elements, positioned on the magnification side with respect to the intermediate imaging position; and
  a relay optical system having B (B is an integer of two or more) pieces of lens elements, positioned on the reduction side with respect to the intermediate imaging position MI,
  wherein a first lens group composed of β pieces (β is one or more and less than B) of lens elements positioned first from the magnification side in the relay optical system has a negative power,
  wherein a lens positioned first from the reduction side in the relay optical system is fixed during focusing, and at least a first lens element in the magnification optical system moves along the optical axis during the focusing,
  wherein the magnification optical system has a second focus lens group composed of one or two pieces of lens elements including the first lens element positioned first from the magnification side, and wherein the second focus lens group corrects field curvature aberration by moving along the optical axis after focusing.

2. The optical system according to claim 1, wherein the magnification optical system satisfies the following condition (3):

$$18 < |fFG2/fw| < 120 \tag{3}$$

where, fFG2 is a focal length of the second focus lens group, and fw is a focal length of the entire optical system at the wide-angle end.

3. An optical system internally having an intermediate imaging position MI that is conjugated to a magnification conjugate point on a magnification side and a reduction conjugate point on a reduction side, respectively, the optical system including:

a magnification optical system having A (A is an integer of three or more) pieces of lens elements, positioned on the magnification side with respect to the intermediate imaging position; and a relay optical system having B (β is an integer of two or more) pieces of lens elements, positioned on the reduction side with respect to the intermediate imaging position MI, wherein a first lens group composed of β pieces (β is one or more and less than B) of lens elements positioned first from the magnification side in the relay optical system has a negative power, wherein the first lens group is fixed during zooming, and wherein the magnification optical system has a second focus lens group that corrects field curvature aberration by moving along the optical axis after focusing.

4. The optical system according to claim 3, wherein the magnification optical system is fixed during zooming, and a part or all of the lens elements of the relay optical system excluding the first lens group move along the optical axis during zooming.

5. The optical system according to claim 1, satisfying the following condition (1):

$$1 < fs1/fw < 100 \tag{1}$$

where, fs1 is a focal length of the first lens group, and fw is a focal length of the entire optical system at the wide-angle end.

6. The optical system according to claim 5, wherein the magnification optical system Op has a first focus lens group composed of α pieces (α is three or more and less than A) of lens elements including the first lens element, and satisfy the following condition (2):

$$2 < |fFG1/fw| < 10 \tag{2}$$

where, fFG1 is a focal length of the first focus lens group, and fw is a focal length of the entire optical system at the wide-angle end.

7. An optical system internally having an intermediate imaging position MI that is conjugated to a magnification conjugate point on a magnification side and a reduction conjugate point on a reduction side, respectively, the optical system including:

a magnification optical system having A (A is an integer of three or more) pieces of lens elements, positioned on the magnification side with respect to the intermediate imaging position; and a relay optical system having B (B is an integer of two or more) pieces of lens elements, positioned on the reduction side with respect to the intermediate imaging position MI, wherein a first lens group composed of β pieces (β is one or more and less than B) of lens elements positioned first from the magnification side in the relay optical system has a negative power, wherein the relay optical system is fixed during focusing, and a part or all of the lens elements in the magnification optical system move along the optical axis during focusing, and wherein the magnification optical system has a second focus lens group that corrects field curvature aberration by moving along the optical axis after focusing.

8. The optical system according to claim 7, satisfying the following condition (4):

$$1.0 < |ff/fw| < 5 \tag{4}$$

where, ff is a focal length of the magnification optical system, and fw is a focal length of the entire optical system at the wide-angle end.

9. The optical system according to claim 7, satisfying the following condition (5):

$$1.5 < |fr/fw| < 5 \tag{5}$$

where, fr is a focal length of the relay optical system at the wide-angle end, and fw is a focal length of the entire optical system at the wide-angle end.

10. The optical system according to claim 1, wherein the relay optical system is constituted of any one of: (a) a first lens group having a negative power, a second lens group having a positive power, a third lens group having a positive or negative power, a fourth lens group having a positive power, arranged in order from the magnification side to the reduction side; and (b) a first lens group having a negative power, a second lens group having a positive power, a third lens group having a negative power, a fourth lens group having a positive power, and a fifth lens group having a positive power, arranged in order from the magnification side to the reduction side.

11. The optical system according to claim 1, satisfying the following condition (6):

$$|\omega| > 60 \tag{6}$$

where, ω is a maximum half angle of view at the wide-angle end.

12. An image projection apparatus comprising:
the optical system according to claim 1; and
an image forming element that generates an image to be projected through the optical system onto a screen.

13. An imaging apparatus comprising:
the optical system according to claim 1; and
an imaging element that receives an optical image formed by the optical system to convert the optical image into an electrical image signal.

* * * * *